(12) United States Patent
Suzuki et al.

(10) Patent No.: US 12,055,937 B2
(45) Date of Patent: Aug. 6, 2024

(54) AUTOMATED TRAVEL SYSTEM FOR SPRAYING WORK

(71) Applicant: Yanmar Power Technology Co., Ltd., Osaka (JP)

(72) Inventors: Akihiro Suzuki, Osaka (JP); Akihiro Nakahata, Osaka (JP); Yoshiharu Mizukura, Osaka (JP); Keita Kitano, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 402 days.

(21) Appl. No.: 17/620,702

(22) PCT Filed: Jun. 17, 2020

(86) PCT No.: PCT/JP2020/023849
§ 371 (c)(1),
(2) Date: Dec. 19, 2021

(87) PCT Pub. No.: WO2020/256034
PCT Pub. Date: Dec. 24, 2020

(65) Prior Publication Data
US 2022/0244732 A1 Aug. 4, 2022

(30) Foreign Application Priority Data

Jun. 20, 2019 (JP) ................................ 2019-114953

(51) Int. Cl.
*A01G 25/09* (2006.01)
*A01M 7/00* (2006.01)
(Continued)

(52) U.S. Cl.
CPC ........... *G05D 1/0212* (2013.01); *A01G 25/09* (2013.01); *A01M 7/00* (2013.01); *A01D 46/30* (2013.01)

(58) Field of Classification Search
CPC ....... G05D 1/0212; A01G 25/09; A01M 7/00; A01D 46/30
See application file for complete search history.

(56) References Cited

U.S. PATENT DOCUMENTS

2016/0368011 A1 12/2016 Feldhaus et al.
2019/0104721 A1* 4/2019 Sullivan .............. A01M 7/0042
(Continued)

FOREIGN PATENT DOCUMENTS

JP 2017147958 A 8/2017

OTHER PUBLICATIONS

Oberti Roberto et al: "Selective spraying of grapevines for disease control using a modular agricultural robot", Biosystems Engineering, Elsevier, Amsterdam, NL, vol. 146, Jan. 13, 2016(Jan. 13, 2016), pp. 203-215, XP029597690, ISSN: 1537-5110, DOI: 10.1016/J.BIOSYSTEMSENG.2015.12.004.

*Primary Examiner* — Edwin A Young
(74) *Attorney, Agent, or Firm* — Chris Mizumoto

(57) ABSTRACT

This automated travel system for spraying work has a target path generation unit for generating a target path for a spraying work. A work vehicle is provided with left and right liquid spraying units which have spraying patterns including: a four-direction spraying pattern in which each of the left and right liquid spraying units sprays a liquid to both the left and right directions; and a direction-restricted spraying pattern in which the number of spraying directions of the left and right liquid spraying units is restricted to 3 or less. The target path generation unit generates the target path P in a path setting to incorporate a four-direction spraying path for which the four-direction spraying pattern is set as a spraying pattern and direction-restricted spraying paths for which the direction-restricted spraying pattern is set as a spraying pattern.

6 Claims, 26 Drawing Sheets

(51) Int. Cl.
  *G05D 1/00*    (2006.01)
  *A01D 46/30*   (2006.01)

(56)         References Cited

U.S. PATENT DOCUMENTS

2020/0029490 A1*  1/2020  Bertucci .............. G06V 10/757
2020/0310432 A1*  10/2020 Ott ....................... G05D 1/0297

* cited by examiner

AUTOMATED TRAVEL SYSTEM FOR SPRAYING WORK

CROSS-REFERENCE

This application is a US National Stage Application under 35 U.S.C. § 371 of International Application No. PCT/JP2020/023849 filed Jun. 17, 2020, which claims foreign priority of JP2019-114953 filed Jun. 20, 2019, the disclosures of which are hereby incorporated by reference in their entirety.

TECHNICAL FIELD

The present invention relates to an automated driving system for spraying work that enables automated driving of a work vehicle, which sprays a chemical, water, or the like on spray target objects, such as trees and crops that are aligned in multiple rows.

BACKGROUND ART

In recent years, there has been a development of an automated driving system for a work vehicle that generates a target path according to a registered work site and makes a work vehicle perform automated driving according to this target path, so as to make the work vehicle perform a work that is suitable for the work site.

In the meantime, in a work site such as an orchard including a grape orchard or the like, a farm including a tea plantation or the like, and a field including a corn field or the like, work target objects such as fruit trees, tea trees, and agricultural products are planted side by side in multiple rows. Further, in such a work area, it is desired to develop an automated driving system for spraying work so that the spraying work for spraying a chemical, water, or the like on work target objects, such as fruit trees and agricultural products, can be efficiently performed during automated driving of the work vehicle.

Therefore, conventionally, a work vehicle for spraying is configured such that a work vehicle having a gate shape so as to straddle a spray target row in which spray target objects such as fruit trees or tea trees are linearly arranged while driving is equipped with a chemical spray device that sprays a chemical on the spray target objects in the straddled spray target row, and there has been a proposal that this work vehicle for spraying be equipped with an image-capturing device that captures an image of the front of the work vehicle and a control part that controls driving of the work vehicle based on the image captured by the image-capturing device, so that the work vehicle is configured to perform automated driving while straddling the spray target row and, in the meantime, spray the chemical or the like on each spray target object in the straddled spray target row (for example, see Patent Literature 1).

CITATION LIST

Patent Literature

Patent Literature 1: Japanese Unexamined Patent Application Publication No. 2017-147958

DISCLOSURE OF INVENTION

Problems to be Solved by the Invention

In the configuration described in Patent Literature 1, in order to spray a chemical or the like on all the spray target objects while automated driving of the work vehicle, it is necessary to make the work vehicle perform automated driving while straddling each spray target row of all the spray target objects, and thus there is a room for improvement of the work efficiency.

In view of this situation, the main subject of the present invention is to provide an automated driving system for spraying work, which enables spraying work on spray target objects, such as trees and crops that are arranged in multiple rows, to be performed properly and efficiently while automated driving of a work vehicle.

Means for Solving the Problems

An automated driving system for spraying work according to the present invention includes a target path generation part that generates a target path for spraying work to be performed on spray target objects arranged in a plurality of rows, an automated driving control part that makes a work vehicle perform automated driving according to the target path, and a spray control part that switches spraying patterns of left and right liquid spray parts included in the work vehicle, wherein the left and right liquid spray parts are arranged in a state of being capable of spraying in a left-right direction and with an interval in the left-right direction so as to allow a spray target object to pass between the left and right liquid spray parts, the spraying patterns include a four-direction spraying pattern, in which each of the left and right liquid spray parts spray in both left and right directions, and a direction-limited spraying pattern, in which spraying directions of the liquid spray parts are limited to three directions or less, and the target path generation part generates the target path with a path setting including a four-direction spraying path, in which the four-direction spraying pattern is set as the spraying pattern, and a direction-limited spraying path, in which the direction-limited spraying pattern is set as the spraying pattern.

According to the present invention, it is possible to provide an automated driving system for spraying work, which enables spraying work on spray target objects, such as trees and crops that are arranged in multiple rows, to be performed properly and efficiently while automated driving of a work vehicle.

DESCRIPTION OF EMBODIMENTS

Hereinafter, as an example of a form for carrying out the present invention, an explanation based on the drawings will be given of embodiments in which an automated driving system for spraying work according to the present invention is applied to a work vehicle whose spray target objects are fruit trees such as grapes or apples that are planted so as to be aligned in multiple rows in an orchard such as a grape orchard or an apple orchard.

Note that the automated driving system for spraying work according to the present invention can be applied to a work vehicle whose spray target objects are tea trees that are planted side by side in multiple rows in a plantation other than an orchard, such as a tea plantation, crops such as corns that are planted side by side in multiple rows in a vegetable garden, etc.

Figure 1:
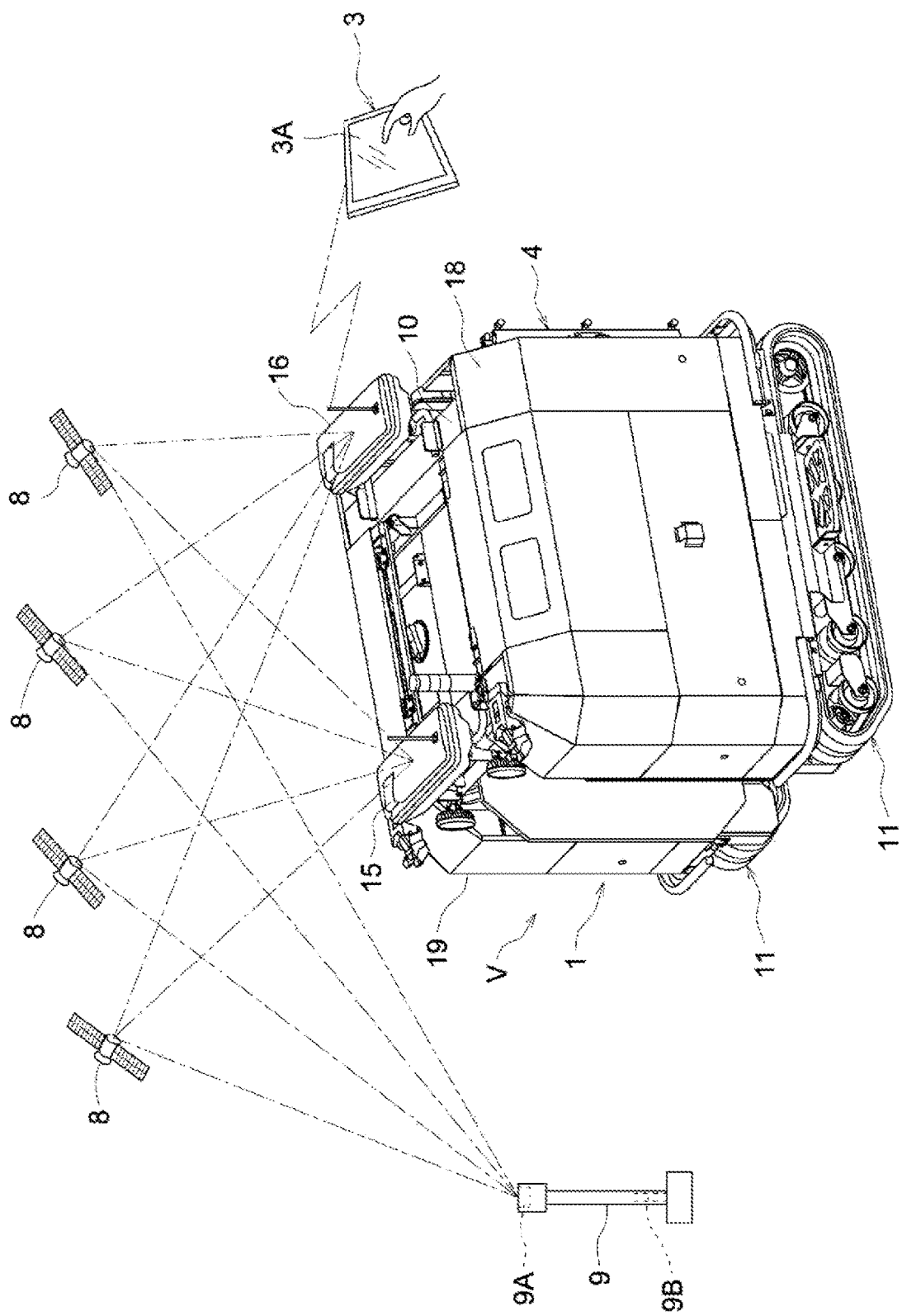
FIG. 1 is a diagram illustrating a schematic configuration of an automated driving system for spraying work.
Figure 2:
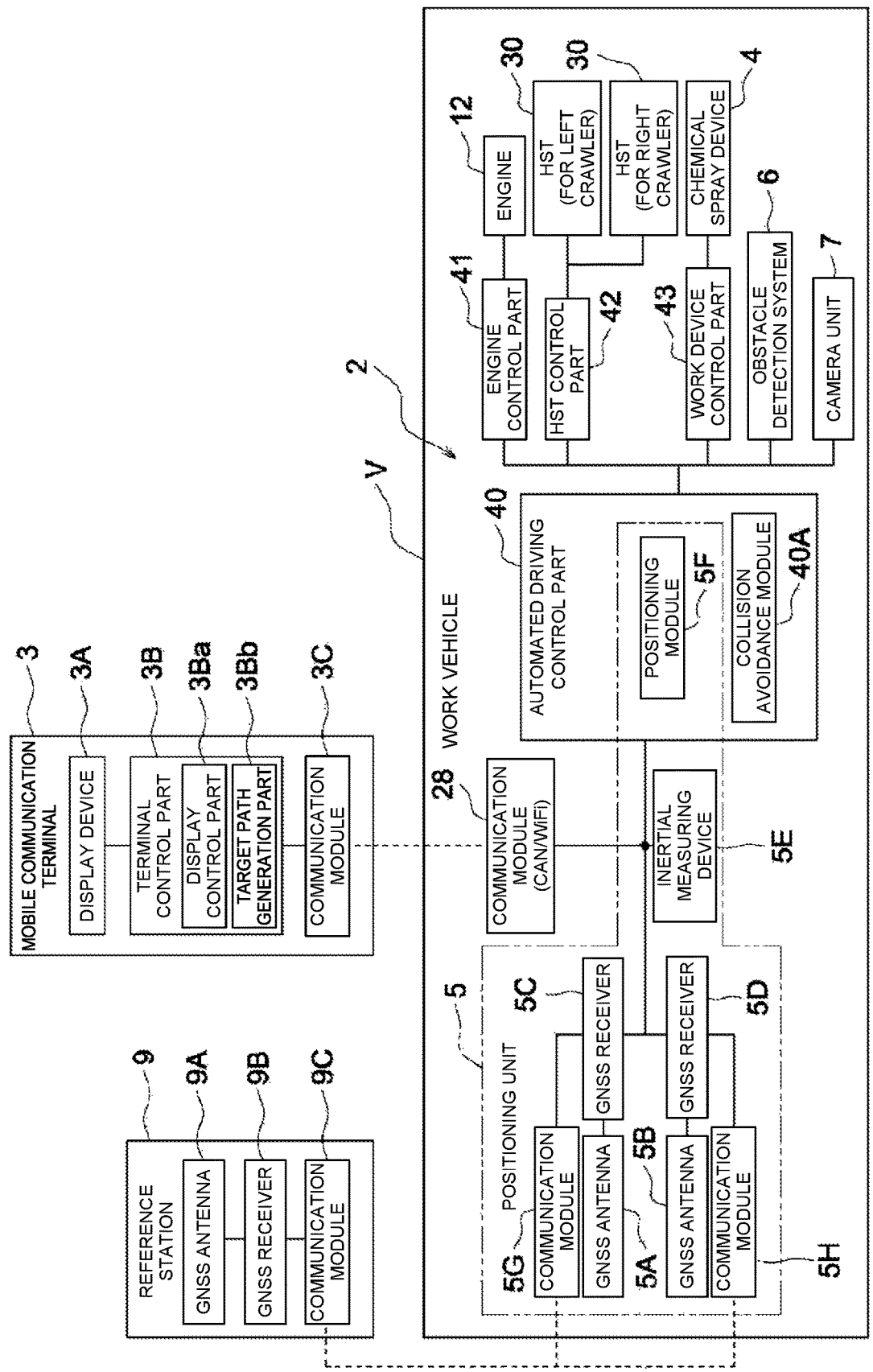
FIG. 2 is a block diagram illustrating the schematic configuration of the automated driving system for spraying work.

As illustrated in FIG. 1 to FIG. 2, it is possible for the work vehicle V for an orchard, which is exemplified in the present embodiment, to perform automated driving in an orchard, which is an example of a work site, by using an automated driving system for spraying work. The automated driving system for spraying work includes the automated driving unit 2 which is mounted on the vehicle body 1 of the work vehicle V, the mobile communication terminal 3 which is an example of a wireless communication device that is set so as to be capable of performing a wireless communication with the automated driving unit 2, etc. The mobile communication terminal 3 includes the multi-touch-type display device (for example, a liquid crystal panel) 3A, which enables displaying of various kinds of information related to automated driving, input operations, etc.

As illustrated in FIG. 1 to FIG. 8, the work vehicle V is equipped with the vehicle body 1 which has a gate shape so as to straddle fruit trees such as grapes or apples that are planted side by side in multiple rows in an orchard when driving, the spray device 4 which sprays a liquid such as a chemical or water on fruit trees to be the work targets, the positioning unit 5 which measures the current position, current direction, etc., of the vehicle body 1 by utilizing GNSS (Global Navigation Satellite System) which is an example of a satellite positioning system, the obstacle detection system 6 which monitors the surroundings of the vehicle body 1 and detects an obstacle that exists around the vehicle body 1, the camera unit 7 which captures images of the front side and rear side of the vehicle body 1, etc. The obstacle detection system 6 detects fruit trees or the like planted in an orchard as obstacles.

Note that, in addition to the spray device 4, it is possible that this work vehicle V is equipped with a work device such as a clipper-type plucking device that performs plucking on fruit trees to be the work targets, a cultivator that performs weeding and crushing soil, etc., between trees, etc. The mobile communication terminal 3 can employ an HMI tablet, a smartphone, etc. For the wireless communication, a wireless LAN (Local Area Network) such as Wi-Fi®, a short-range wireless communication such as Bluetooth®, etc., can be employed.

As illustrated in FIG. 1 and FIG. 3 to FIG. 8, the vehicle body 1 has the vehicle body frame 10 which is formed in a gate shape in the front-rear direction view, and the left and right crawlers 11 which are connected to the left and right lower end parts of the vehicle body frame 10. On the left side section of the vehicle body 1, the engine 12, the battery 13, etc., are mounted. The right side section of the vehicle body 1 is equipped with the oil tank 14, which is made of a steel plate formed in a lateral L-shape, the storage tank 4A of the spray device 4, etc. The ceiling part of the vehicle body 1 is equipped with the front antenna unit 15 which is arranged on the front side of the ceiling part, the rear antenna unit 16 which is arranged on the rear side of the ceiling part, the stacked indicator light 17 which indicates the driving status of the vehicle body 1, etc. The engine 12, the battery 13, etc., are covered with the left cover member 18 formed as an outer surface on the left side of the vehicle body 1. The oil tank 14, the storage tank 4A, etc., are covered with the right cover member 19 formed as an outer surface on the right side of the vehicle body 1.

As illustrated in FIG. 3 to FIG. 8, the vehicle body frame 10 has the left and right side frames 20 which are arranged in parallel with a predetermined distance in the left-right direction, the front cross member 21 which bridges the upper end parts on the front end side of the left and right side frames 20, the rear cross member 22 which bridges the upper end parts on the rear end side of the left and right side frames 20, etc. Accordingly, the vehicle body frame 10 is formed in a gate shape securely having a space for allowing fruit trees to pass through between the left and right side frames 20. To the left and right side frames 20, the inner wall members 23 formed as the left and right inner surfaces of the vehicle body 1 are attached, respectively.

As illustrated in FIG. 4 to FIG. 7, each of the side frames 20 has the base member 20A which extends in the front-rear direction of the vehicle body 1, the front columnar support member 20B which extends upward from the front end part of the base member 20A, the rear columnar support member 20C which extends upward from the rear end part of the base member 20A, the upper-side member 20D which bridges the upper end part of the front columnar support member 20B and the upper end part of the rear columnar support member 20C, etc. Accordingly, the left and right side frames 20 are formed in a rectangular shape in the left-right direction view.

Figure 4:
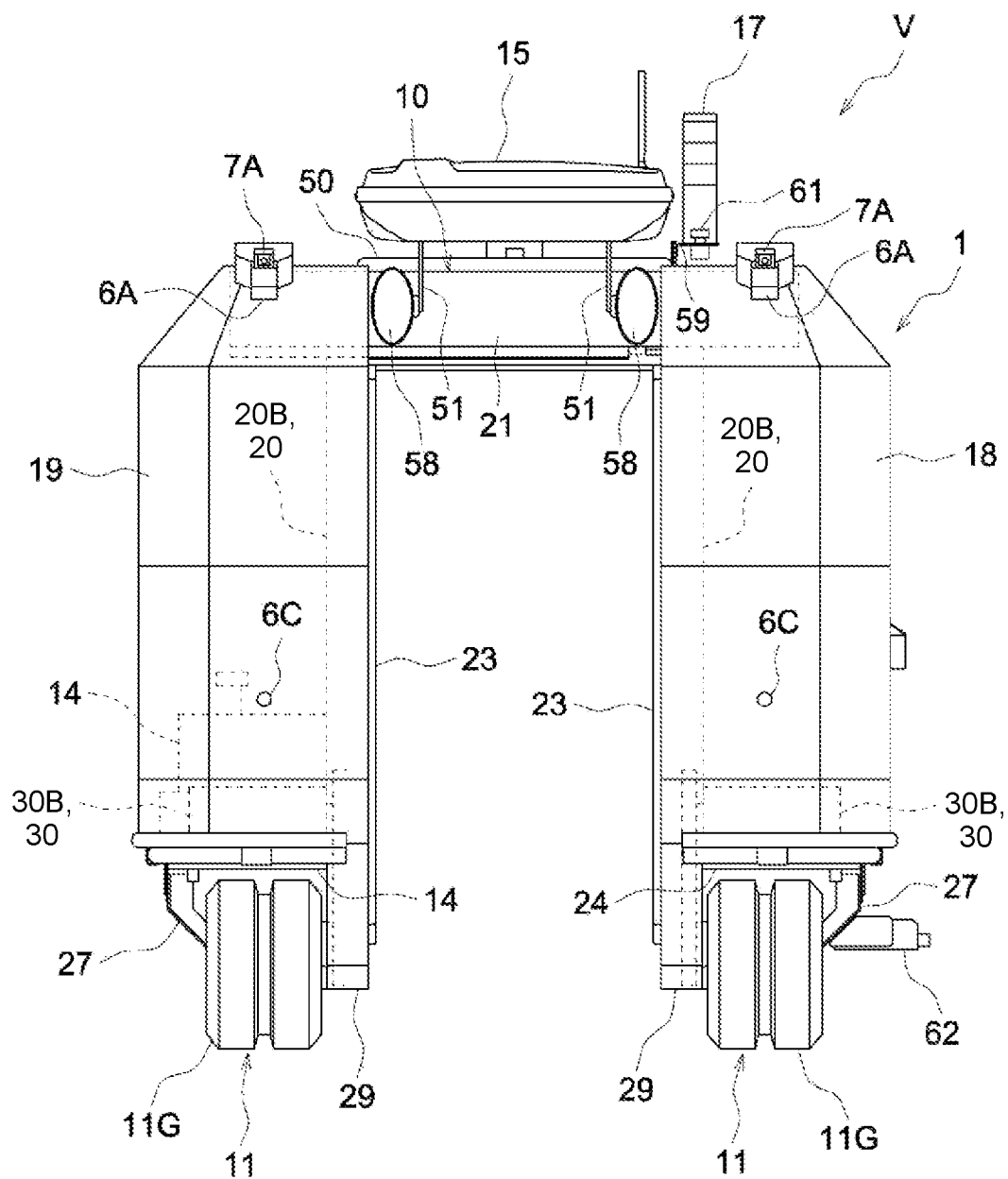
FIG. 4 is a front view illustrating the configuration of the work vehicle for an orchard.
Figure 5:
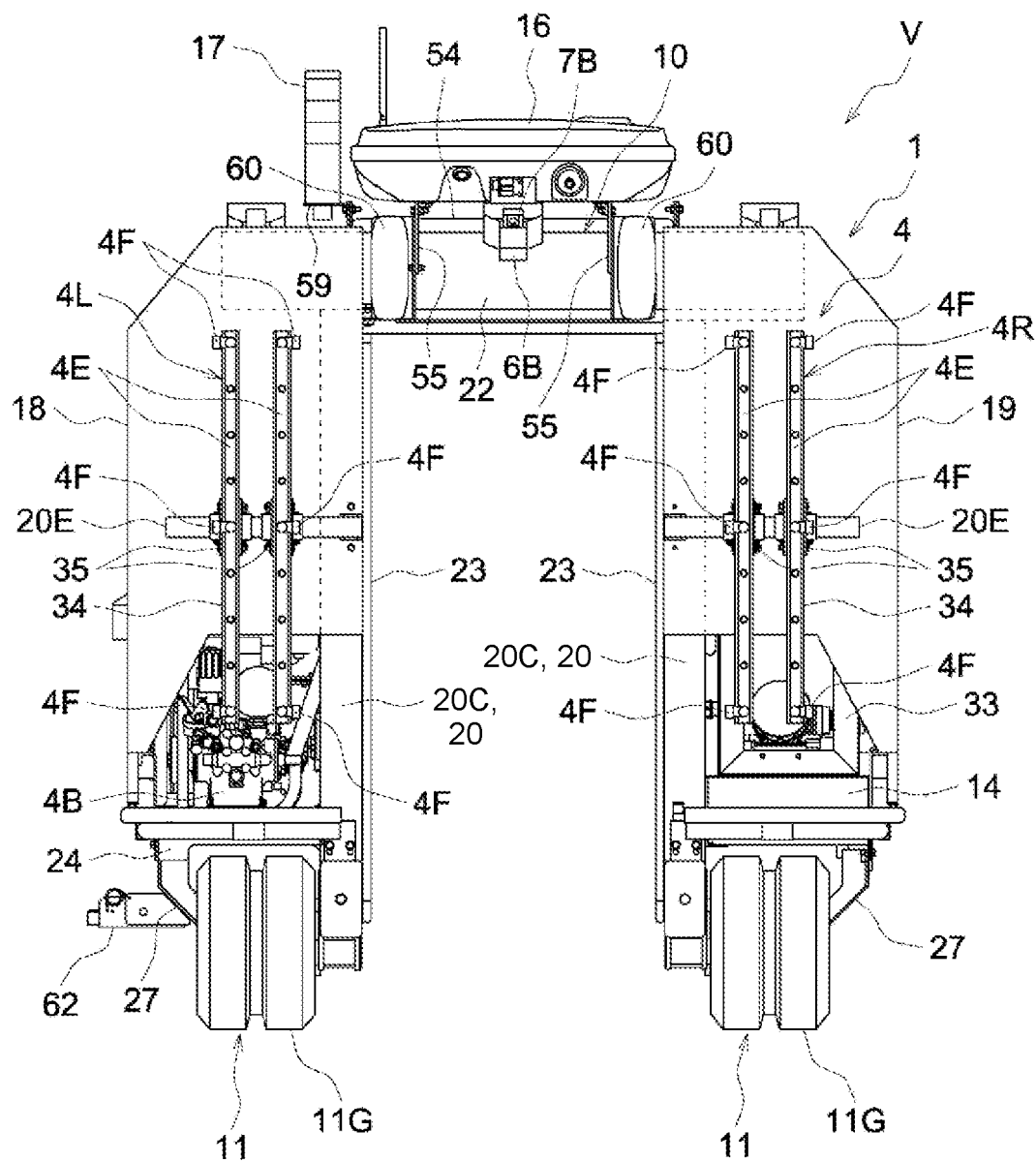
FIG. 5 is a rear view illustrating the configuration of the work vehicle for an orchard.
Figure 6:
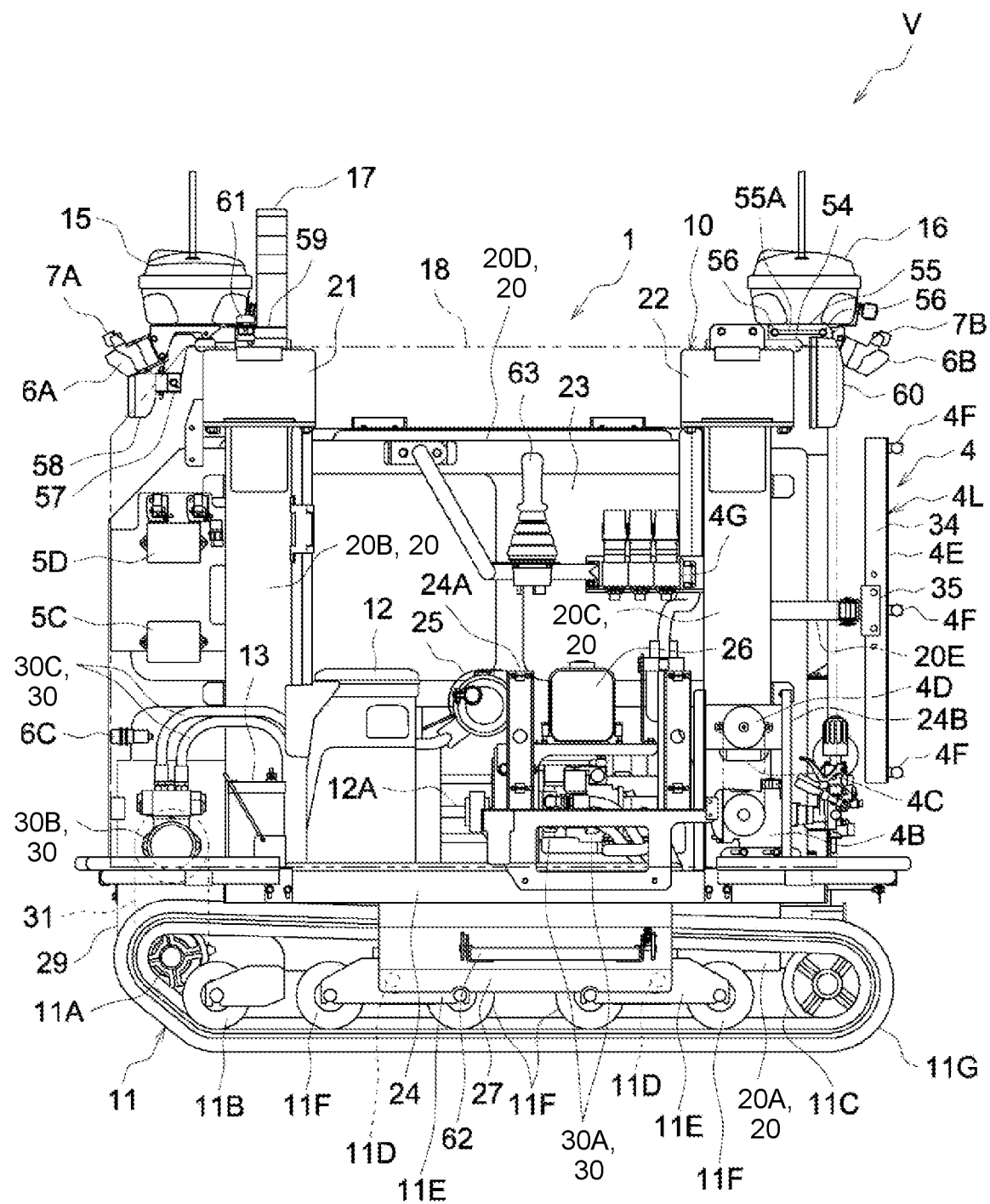
FIG. 6 is a right side view illustrating the configuration of the work vehicle for an orchard in a state where a left cover member is removed.

As illustrated in FIG. 3 to FIG. 6, of the left and right side frames 20, the left side frame 20 supports the mounting platform 24 on which the engine 12, the battery 13, etc., are mounted. The mounting platform 24 protrudes leftward from the lower part of the left side frame 20 so as to be arranged right above and in close proximity to the left crawler 11. As illustrated in FIG. 6, the mounting platform 24 is equipped with the first support part 24A that supports the muffler 25 and the fuel tank 26.

Figure 7:
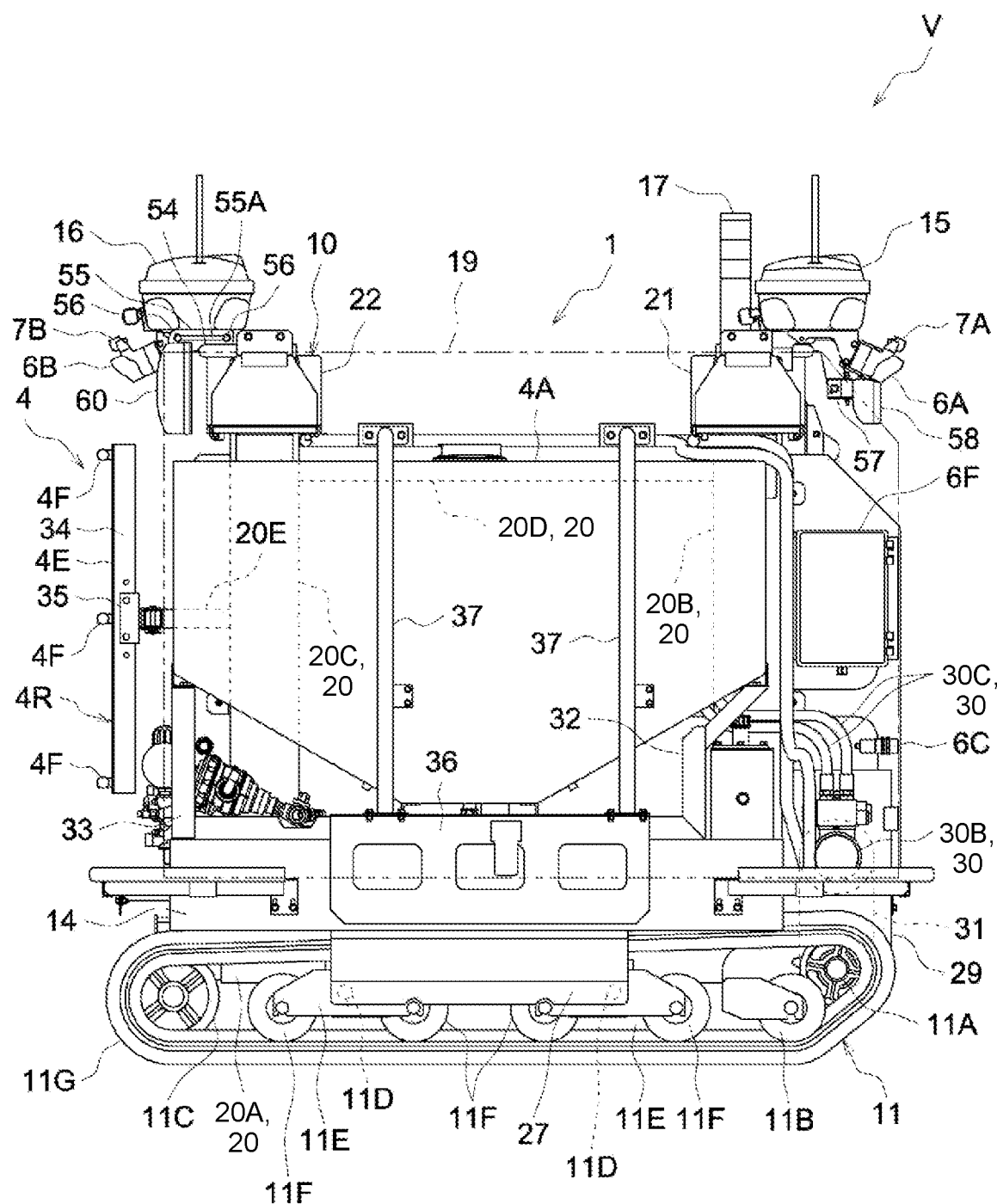
FIG. 7 is a left side view illustrating the configuration of the work vehicle for an orchard in a state where a right cover member is removed.

As illustrated in FIG. 4 to FIG. 5 and FIG. 7, the oil tank 14 which is in a state of extending rightward from the lower part of the right side frame 20 is connected to the right side frame 20. Accordingly, the oil tank 14 is arranged right above and in close proximity to the right crawler 11.

That is, in this work vehicle V, the engine 12 and the battery 13, which are heavy, and the oil tank 14, which is heavy when storing oil, etc., are respectively arranged on the left and right sides in the lower part of the vehicle body 1. Accordingly, this work vehicle V is designed to have a low center of gravity in a left-right balanced state. As a result, it is possible for the work vehicle V to stably perform contour driving, etc. on a slope in an orchard.

Figure 3:
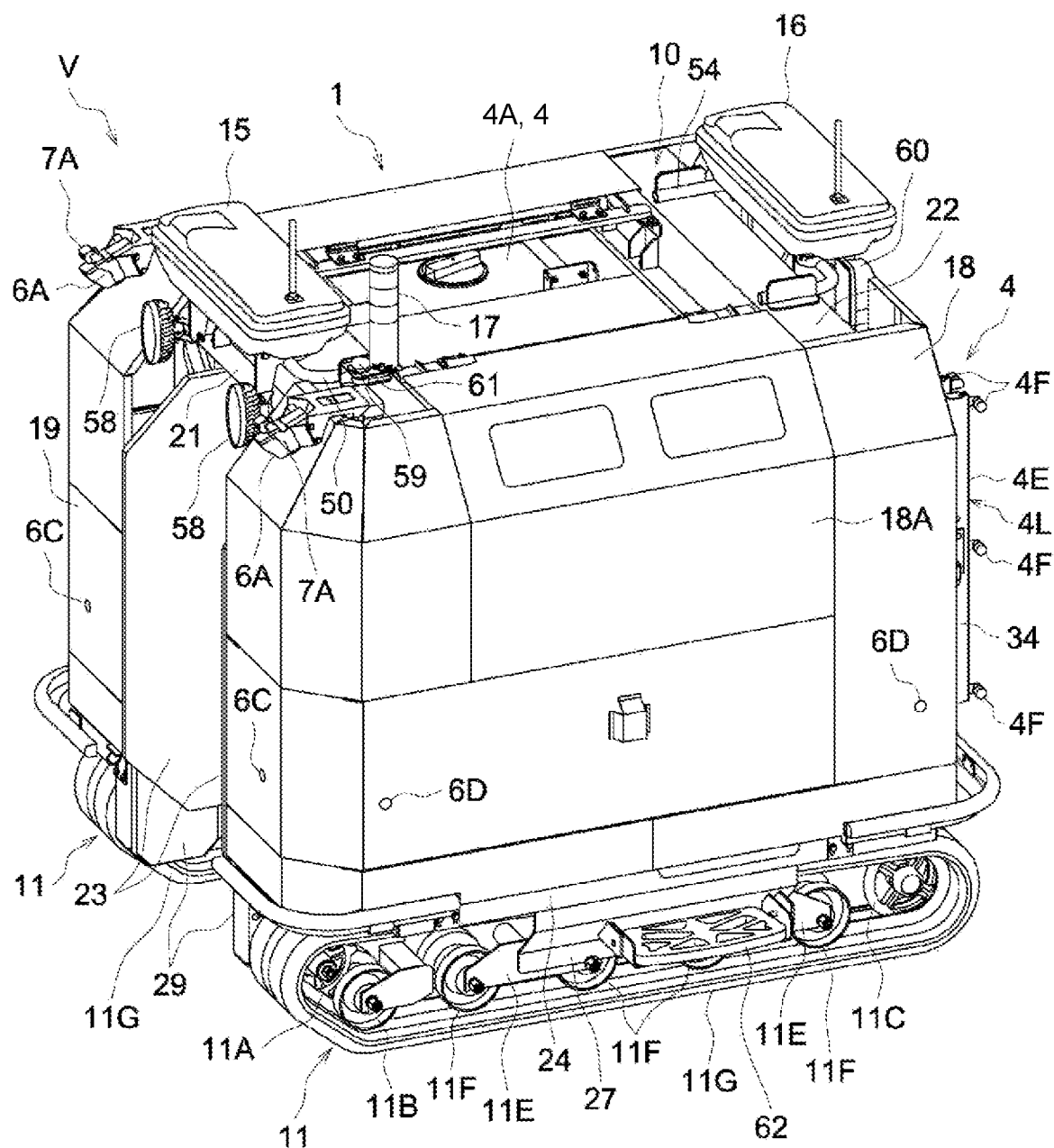
FIG. 3 is a perspective view illustrating a configuration of the work vehicle for an orchard.

As illustrated in FIG. 3 and FIG. 6 to FIG. 7, the base members 20A of the side frames 20 are also used as the track frames of the left and right crawlers 11. In each of the left and right crawlers 11, the drive sprocket 11A and the first road wheel 11B are supported in a rotatable manner at the front end part of the track frame (base member) 20A. In the rear end part of the track frame 20A, the idler wheel 11C for tensioning is supported so as to be displaceable in the front-rear direction. The middle part of the track frame 20A with respect to the front-rear direction is equipped with the front and rear equalizer arms 11E which pivotally swing in the up-down direction with the front and rear support shafts 11D extending in the laterally outward direction from the track frame 20A. The second road wheels 11F are supported in a rotatable manner at the front and rear idler end parts in each of the equalizer arms 11E. That is, the four second road wheels 11F are supported at the middle part of the track frame 20A with respect to the front-rear direction so as to be swingable/displaceable in the up-down direction. The crawler belt 11G is wrapped around the drive sprocket 11A, each of the road wheels 11B and 11F, and the idler wheel 11C. The rear part of the track frame 20A is equipped with a tensioning mechanism (not illustrated in the drawings) that biases the idler wheel 11C to displace rearward so as to maintain the crawler belt 11G in a tensioned state.

As illustrated in FIG. 3 to FIG. 6, in the left crawler 11, the left end parts of the front and rear support shafts 11D are connected to the left end part of the mounting platform 24 via the left support plate 27. As illustrated in FIG. 4 to FIG. 5 and FIG. 7, in the right crawler 11, the right end parts of the front and rear support shafts 11D are connected to the right end part of the oil tank 14 via the right support plate 27.

That is, in this work vehicle V, the vehicle body frame 10 and the left and right crawlers 11 are configured as an integrated structure.

As illustrated in FIG. 4 and FIG. 6 to FIG. 7, the power from the engine 12 is transmitted to the drive sprockets 11A of the respective crawlers 11 via the pair of hydro-static continuously-variable transmissions (hereinafter referred to as HSTs) 30 and the left and right chain-type power-transmission device 31. Each HST 30 employs a separate-type HST having the hydraulic pump 30A of a variable displacement and axial plunger type, the hydraulic motor 30B of a fixed displacement and axial plunger type, the multiple hydraulic pipes 30C connecting the hydraulic pump 30A and the hydraulic motor 30B, etc.

With the above-described configuration, the left and right crawlers 11 are driven by the power from the engine 12 in a state where independent gear change can be performed with the corresponding HSTs 30. Accordingly, this vehicle body 1 is turned into the forward-traveling state when the left and right crawlers 11 are driven at an even speed in the forward-traveling direction so that the vehicle body 1 travels straight in the forward-traveling direction and is turned into the rearward-traveling state when the left and right crawlers 11 are driven at an even speed in the rearward-traveling direction so that the vehicle body 1 travels straight in the rearward-traveling direction. The vehicle body 1 is turned into the forward-traveling turning state when the left and right crawlers 11 are driven at uneven speeds in the forward-traveling direction so that the vehicle body 1 makes a gentle turn while traveling forward and is turned into the rearward-traveling turning state when the left and right crawlers 11 are driven at uneven speeds in the rearward-traveling direction so that the vehicle body 1 makes a gentle turn while traveling rearward. The vehicle body 1 is turned into the pivot turning state when driving of either one of the left and right crawlers 11 is stopped while the other crawler 11 is driven and is turned into the spin turning state when the left and right crawlers 11 are driven at an even speed in the forward-traveling direction and the backward-traveling direction. The vehicle body 1 is turned into the driving-stopped state when the driving of the left and right crawlers 11 is stopped.

Note that it is also possible that the left and right crawlers 11 are configured as an electric type in which the drive sprockets 11A thereof are driven by left and right electric motors.

As illustrated in FIG. 6, the hydraulic pump 30A of each HST 30 is of a double type, which is driven by a single pump shaft (not illustrated in the drawings) directly connected to the output shaft 12A of the engine 12. The double hydraulic pump 30A is mounted on the mounting platform 24 so as to be located right below the fuel tank 26. As illustrated in FIG. 3 to FIG. 4 and FIG. 6 to FIG. 7, the left and right hydraulic motors 30B are attached to the upper part of the power-transmission case 29, which is connected to a lower part of the front end of each side frame 20. Each of the hydraulic pipes 30C is installed along the vehicle body frame 10. Inside the corresponding power-transmission cases 29, the left and right chain-type power-transmission devices 31 transmit power from output shafts (not illustrated in the drawings) of the hydraulic motors 30B to drive shafts (not illustrated in the drawings) which integrally rotate together with the drive sprockets 11A of the crawlers 11.

As illustrated in FIG. 3 and FIG. 5 to FIG. 8, the spray device 4 has the storage tank 4A that stores a chemical or the like, the spray pump 4B that transfers a chemical or the like with a pressure, the electric spray motor 4C that drives the spray pump 4B, the belt-type power-transmission device 4D that transmits power from the spray motor 4C to the spray pump 4B, the spray pipes 4E of which two pipes are arranged in parallel in a vertical posture on each of the left and right sides at the rear part of the vehicle body 1, the total of twelve spray nozzles 4F of which three nozzles are arranged on each spray pipe 4E, the electronically-controlled valve unit 4G which changes the spraying amount and spraying pattern of a chemical or the like, multiple pipes for spraying (not illustrated in the drawings) that connect the above-mentioned components, etc.

The storage tank 4A is supported by the oil tank 14 via the front and rear support frames 32 and 33, which are arranged on the upper surface of the oil tank 14. The spray pump 4B is mounted at the rear part of the mounting platform 24. The spray motor 4C is supported by the second support part 24B, which is arranged at the rear part of the mounting platform 24. The spray motor 4C is arranged right above the spray pump 4B. The two spray pipes 4E on the left side are respectively attached to the support member 20E, which is in an L-shape in plan view and is arranged on the left side frame 20, via the pipe holder 34 that extends in the up-down direction and the bracket 35 that is connected to the middle part of the pipe holder 34 with respect to the up-down direction. The two spray pipes 4E on the right side are respectively attached to the support member 20E, which is in an L-shape in plan view and is arranged on the right side frame 20, via the pipe holder 34 that extends in the up-down direction and the bracket 35 that is connected to the middle part of the pipe holder 34 with respect to the up-down direction.

Each spray nozzle 4F is attached to the corresponding spray pipe 4E so as to be repositionable in the up-down direction. Accordingly, the respective spray nozzles 4F can change their vertical spacing and their height positions relative to the spray pipes 4E according to the spraying targets. Each pipe holder 34 is connected via a pin to the corresponding bracket 35 so as to be repositionable in the up-down direction. Accordingly, the respective spray nozzles 4F can change their height positions relative to the vehicle body 1 for each pipe holder 34 according to the spraying targets. Each bracket 35 is connected via a pin to the corresponding support member 20E so as to be repositionable in the left-right direction. Accordingly, the respective spray nozzles 4F can change their left-right positions relative to the vehicle body 1 for each bracket 35 according to the spraying targets.

Note that, in the spray device 4, the number of spray nozzles 4F arranged for each spray pipe 4E can be changed in various ways according to the type of fruit trees, the length of each spray pipe 4E, etc.

As illustrated in FIG. 3 and FIG. 5 to FIG. 9, of the respective spray nozzles 4F, the three spray nozzles 4F arranged for the leftmost spray pipe 4E spray a chemical or the like in a leftward direction toward the fruit trees Z located on the left outer side of the vehicle body 1. Of the respective spray nozzles 4F, the three spray nozzles 4F arranged for the middle-left spray pipe 4E, which is adjacent to the leftmost spray pipe 4E, spray a chemical or the like in a rightward direction toward the fruit trees Z located in the central space of the vehicle body 1 with respect to the left-right direction. Of the respective spray nozzles 4F, the three spray nozzles 4F arranged for the rightmost spray pipe 4E spray a chemical or the like in a rightward direction toward the fruit trees Z located on the right outer side of the vehicle body 1. Of the respective spray nozzles 4F, the three spray nozzles 4F arranged for the middle-right spray pipe 4E, which is adjacent to the rightmost spray pipe 4E, spray a chemical or the like in a leftward direction toward the fruit trees Z located in the central space of the vehicle body 1 with respect to the left-right direction.

With the above-described configuration, in this spray device 4, the two spray pipes 4E and six spray nozzles 4F arranged at the rear part on the left side of the vehicle body 1 function as the left liquid spray part 4L. Further, the two spray pipes 4E and six spray nozzles 4F arranged at the rear part on the right side of the vehicle body 1 function as the right liquid spray part 4R. Further, the left and right liquid spray parts 4L and 4R are arranged at the rear part of the vehicle body 1 in a state of being able to perform spraying in the left and right directions, so as to have a distance between the left and right liquid spray parts 4L and 4R in the left-right direction for allowing the fruit trees Z to pass through.

In the spray device 4, the spraying patterns of the left and right liquid spray parts 4L and 4R include the four-direction spraying pattern, in which the left and right respective liquid spray parts 4L and 4R spray in both left and right directions, and the direction-limited spraying pattern, in which the spraying directions of the left and right liquid spray parts 4L and 4R are limited. The direction-limited spraying pattern includes the left-side three-direction spraying pattern, in which the left liquid spray part 4L sprays in both left and right directions and the right liquid spray part 4R sprays only in the left direction, the right-side three-direction spraying pattern, in which the left liquid spray part 4L sprays only in the right direction and the right liquid spray part 4R sprays in both left and right directions, and the two-direction spraying pattern, in which the left liquid spray part 4L sprays only in the right direction and the right liquid spray part 4R sprays only in the left direction.

As illustrated in FIG. 7, the left end part of the oil tank 14 is supported by the base member 20A of the right side frame 20. The support plate 36 is connected to the right end part of the oil tank 14. The upper end part of the support plate 36 is connected to the upper-side member 20D of the right side frame 20 via the front and rear support members 37. Accordingly, the right end part of the oil tank 14 is supported by the upper-side member 20D of the right side frame 20 via the support plate 36 and the front and rear support members 37.

That is, since both left and right end parts of the oil tank 14 are respectively supported by the right side frame 20, the oil tank 14 has a support strength which is high enough to be used as a mounting platform on which the storage tank 4A is mounted. Note that the shape of the oil tank 14 in plan view is left-right reversal of the shape of the mounting platform 24 in plan view.

As illustrated in FIG. 2, the vehicle body 1 is equipped with the automated driving control part 40 which makes the vehicle body 1 perform automated driving according to the target path P (see FIG. 9) in an orchard based on positioning information obtained from the positioning unit 5, etc., the engine control part 41 which performs control related to the engine 12, the HST control part 42 which performs control related to each HST 30, the work device control part 43 which performs control related to the work device W such as the spray device 4, etc. Each of the control parts 40 to 43 is structured with an electronic control unit on which a microcontroller or the like is mounted, various kinds of information and control programs stored in a non-volatile memory (e.g., an EEPROM such as a flash memory) of the microcontroller, etc. The various kinds of information stored in the non-volatile memory includes the target path P which is generated in advance according to the orchard of the work target, etc.

The respective control parts 40 to 43 are connected in a mutually communicable manner via CAN (Controller Area Network), which is an example of an in-vehicle network. For example, in-vehicle Ethernet, CAN-FD (CAN with Flexible Data rate), or the like may be employed as the in-vehicle network.

Figure 9:
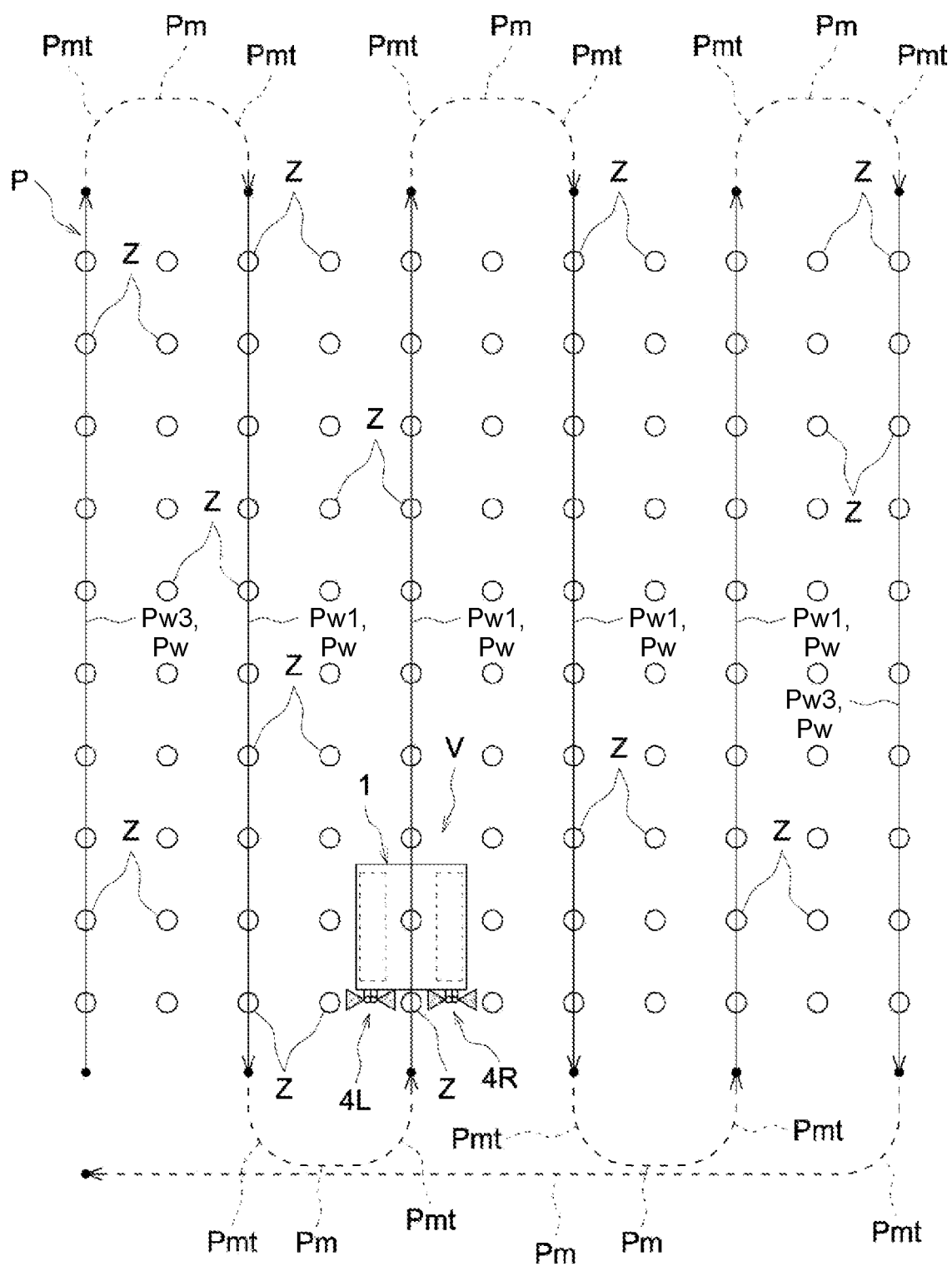
FIG. 9 is a plan view illustrating an example of a target path for spraying work.
Figure 10:
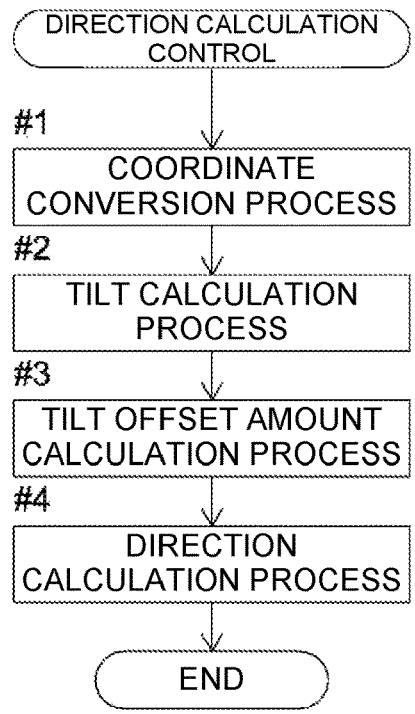
FIG. 10 is a flowchart of direction calculation control.
Figure 11:
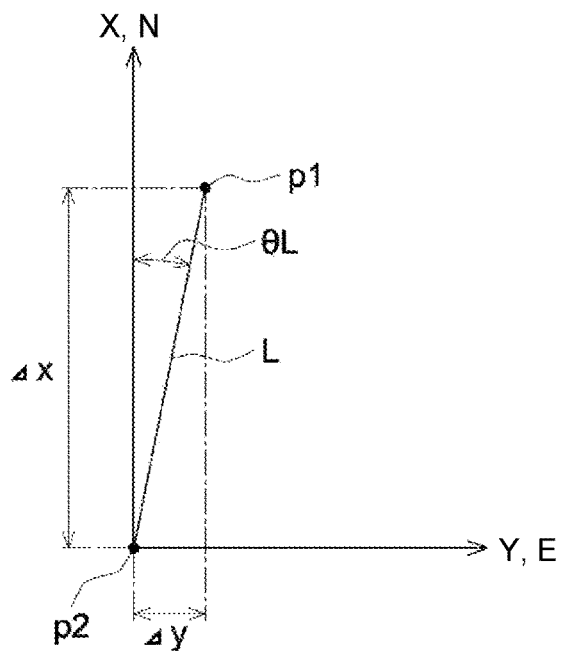
FIG. 11 is an explanatory diagram of a tilt calculation process.
Figure 12:
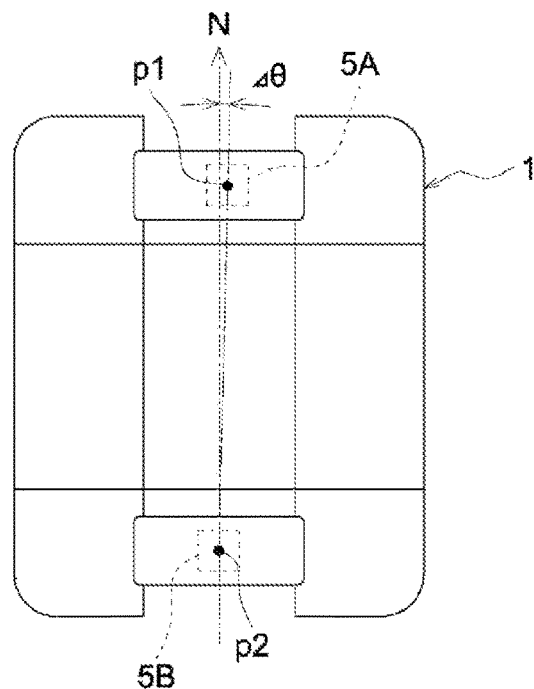
FIG. 12 is an explanatory diagram of a tilt offset amount calculation process.
Figure 13:
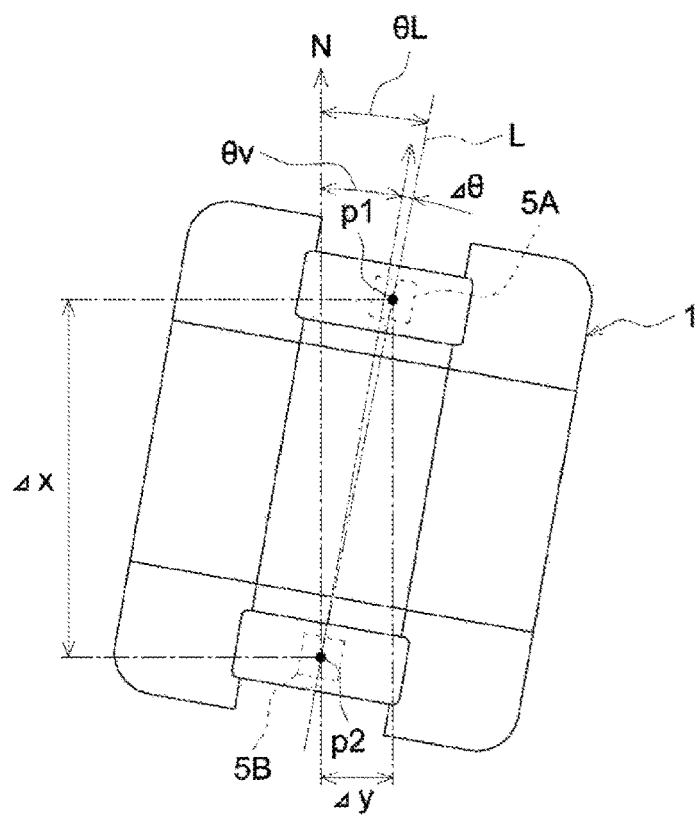
FIG. 13 is an explanatory diagram of a direction calculation process.

As illustrated in FIG. 9, the target path P includes the work paths Pw in multiple rows, on which the work vehicle V drives while spraying a chemical or the like on the fruit trees Z that are planted in multiple rows, and the multiple move paths Pm, which connect work paths Pw in the multiple rows in the driving order of the work vehicle V. Each of the move paths Pm is a path on which the work vehicle V drives without performing a work. Each of the move paths Pm includes a turn path Pmt for changing the direction of the vehicle body 1. The target path P includes various kinds of information related to automated driving, such as the driving direction, set vehicle speed, driving state, working state, etc., of the vehicle body 1 in each of the paths Pw and Pm.

Note that, in each work path Pw, the vehicle speed thereof is set to a relatively high speed (work speed) since the respective work paths Pw are straight paths or approximately straight paths corresponding to the fruit trees Z that are planted side by side in multiple rows. Further, in each turn path Pmt of each move path Pm, the vehicle speed thereof is set to a lower speed (turning speed) than the vehicle speed in the work paths Pw, in order to prevent the work vehicle V from deviating from the turn paths Pmt. On the other hand, since the move paths other than the respective turn paths Pmt are straight paths or approximately straight paths, as with the work paths Pw, the vehicle speed thereof is set to a relatively high speed as with the respective work paths Pw.

Note that the target path P illustrated in FIG. 9 is merely an example, and the target path P can be changed in various ways according to work site information such as the arrangement state and the number of rows of fruit trees Z which vary in each orchard, etc.

As illustrated in FIG. 2, the mobile communication terminal 3 is equipped with the terminal control part 3B that performs control related to the display device 3A, etc. The terminal control part 3B is structured with an electronic control unit on which a microcontroller or the like is mounted, various kinds of information and control programs stored in a non-volatile memory (e.g., an EEPROM such as a flash memory) of the microcontroller, etc. The various kinds of information stored in the non-volatile memory includes work site information, the target path P (see FIG. 9), etc. Accordingly, it is possible to display the work site information, the target path P, etc., on the display device 3A of the mobile communication terminal 3.

The vehicle body 1 and the mobile communication terminal 3 are equipped with the communication modules 28 and 3C that enable a wireless communication between the automated driving control part 40 and the terminal control part 3B. In a case where Wi-Fi is employed for the wireless communication with the mobile communication terminal 3, the communication module 28 of the vehicle body 1 functions as a converter that converts communication information bidirectionally for CAN and Wi-Fi. The terminal control part 3B can obtain various kinds of information related to the vehicle body 1, which include the current position, current direction, etc., of the vehicle body 1, via the wireless communication with the automated driving control part 40. Accordingly, various kinds of information including the current position, current direction, etc., of the vehicle body 1 relative to the target path P can be displayed on the display device 3A of the mobile communication terminal 3.

Figure 8:
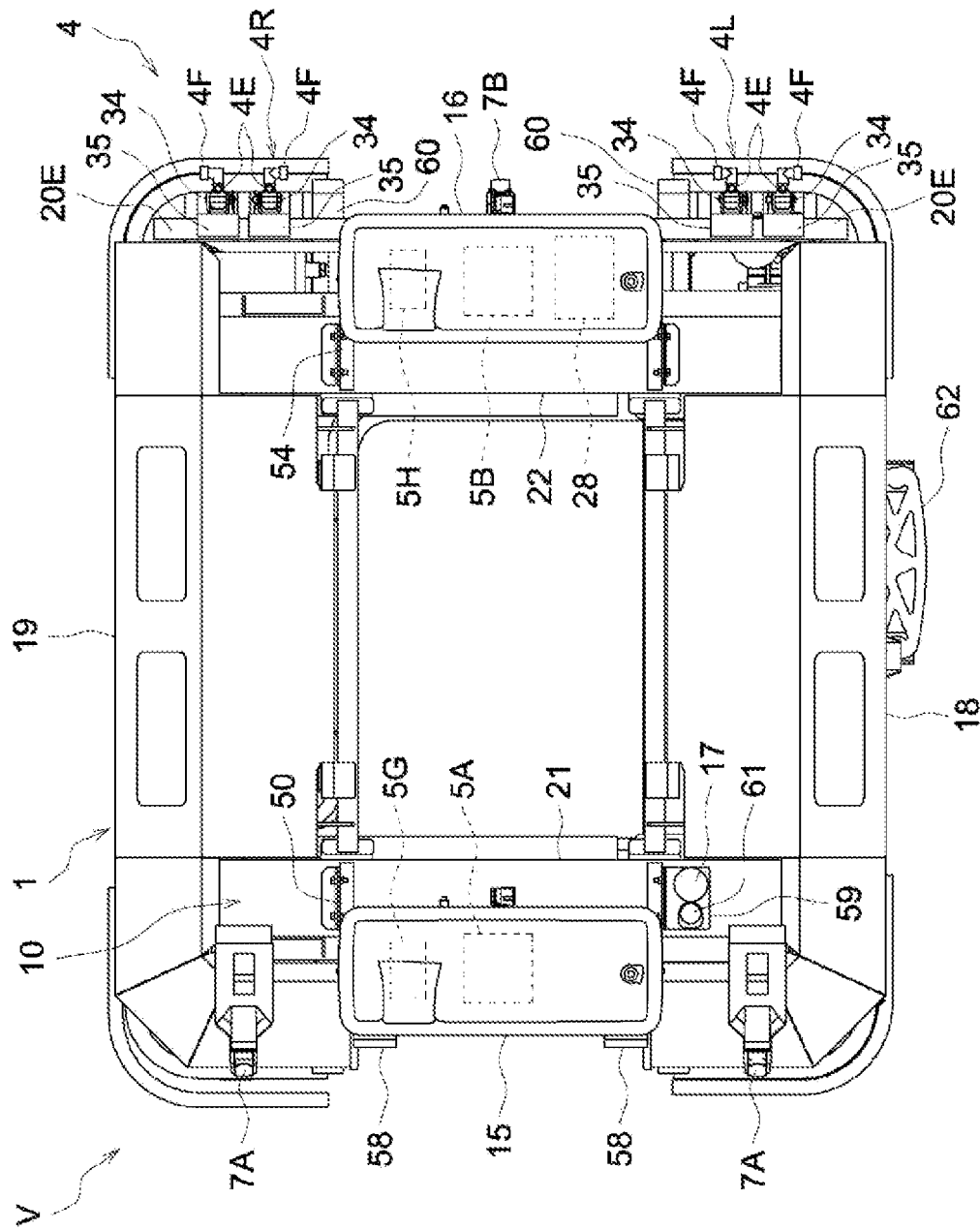
FIG. 8 is a plan view illustrating the configuration of the working vehicle for an orchard.

As illustrated in FIG. 2 and FIG. 8, the positioning unit 5 includes the two GNSS antennas 5A and 5B which receive radio waves transmitted from multiple positioning satellites 8 (see FIG. 1), the two GNSS receivers 5C and 5D which utilize the radio waves received by the respective GNSS antennas 5A and 5B to measure the positions of the respective GNSS antennas 5A and 5B (hereinafter may be simply referred to as the antenna positions), the inertial measuring device (IMU: inertial measurement unit) 5E which measures the posture, direction, etc., of the vehicle body 1, the positioning module 5F which calculates the current position, current direction, etc., of the vehicle body 1 based on position information obtained from the respective GNSS receivers 5C and 5D and measurement information obtained from the inertial measuring device 5E, etc.

The respective GNSS receivers 5C and 5D and the inertial measuring device 5E are connected to the automated driving control part 40 so as to be capable of performing mutual communication via CAN. The inertial measuring device 5E has a three-axis gyroscope, a three-direction acceleration sensor, etc. The positioning module 5F is structured with a control program for positioning, etc., which is stored in a non-volatile memory of the automated driving control part 40.

As positioning methods using GNSS, DGNSS (Differential GNSS), RTK-GNSS (Real Time Kinematic GNSS), etc., can be used. In the present embodiment, RTK-GNSS, which has high accuracy and is suitable for measurement of a movable object, is employed. Accordingly, the reference station 9, which enables positioning by RTK-GNSS, is installed at a known location in the periphery of the orchard.

As illustrated in FIG. 1 to FIG. 2, the reference station 9 is equipped with the GNSS antenna 9A which receives radio waves transmitted from the multiple positioning satellites 8, and the GNSS receiver 9B which utilizes the radio waves received by the GNSS antenna 9A to measure the position of the GNSS antenna 9A (hereinafter may be simply referred to as the antenna position). The GNSS receiver 9B obtains position correction information based on the measured antenna position and the installation position of the reference station 9. The positioning unit 5 and the reference station 9 are equipped with the communication modules 5G, 5H, and 9C which enable a wireless communication between the respective GNSS receivers 5C and 5D of the positioning unit 5 and the GNSS receiver 9B of the reference station 9. Accordingly, each of the GNSS receivers 5C and 5D of the positioning unit 5 can receive position correction information from the GNSS receiver 9B of the reference station 9.

Each of the GNSS receivers 5C and 5D of the positioning unit 5 corrects each antenna position measured by itself, based on the position correction information obtained from the GNSS receiver 9B of the reference station 9. Accordingly, each of the GNSS receivers 5C and 5D can measure the position (latitude, longitude, and altitude in the global coordinate system) of each of the GNSS antennas 5A and 5B with high accuracy. The positioning unit 5 has the GNSS receivers 5C and 5D and the inertial measuring device 5E, so that the inertial measuring device 5E can supplement a decrease in positioning accuracy of the GNSS receivers 5C and 5D, which is caused by deterioration of the surrounding environment. The positioning unit 5 can correct the measurement error, which is accumulated in the inertial measuring device 5E, based on the antenna positions measured by the GNSS receivers 5C and 5D. Although the respective GNSS antennas 5A and 5B are arranged at the top part of the vehicle body 1 so as to increase the reception sensitivity of the respective GNSS antennas 5A and 5B, the positional deviation of the respective antenna positions in the left-right direction of the vehicle body relative to the target path P, which is caused by rolling of the vehicle body 1, can be corrected by the positioning unit 5, based on the installation height of the respective GNSS antennas 5A and 5B and the roll angle of the vehicle body 1, which is measured by the inertial measuring device 5E. Accordingly, the current position, current direction, and attitude angles (yaw angle, roll angle, and pitch angle) of the vehicle body 1 can be measured by the positioning unit 5 with high accuracy.

As illustrated in FIG. 8, the respective GNSS antennas 5A and 5B of the positioning unit 5 are installed in a separated manner at front and rear two positions in the ceiling part of the vehicle body 1 at a predetermined distance in the front-rear direction of the vehicle body. The height positions of the front and rear GNSS antennas 5A and 5B are set to the same height. Of the front and rear GNSS antennas 5A and 5B, the front GNSS antenna 5A is included in the front antenna unit 15 together with the communication module 5G, etc., which are connected to the GNSS receiver 5C corresponding to the front GNSS antenna 5A. The rear GNSS antenna 5B is included in the rear antenna unit 16 together with the communication module 5H which is connected to the GNSS receiver 5D corresponding to this rear GNSS antenna 5B, the inertial measuring device 5E, the communication module 28 corresponding to the mobile communication terminal 3, etc. The positional relationship between the antennas of the front and rear GNSS antennas 5A and 5B and the installation height are stored in a non-volatile memory of the automated driving control part 40.

The positioning module 5F basically calculates the current position of the vehicle body 1 based on the rear antenna position measured by the rear GNSS receiver 5D of the front and rear antenna positions measured by the front and rear GNSS receivers 5C and 5D. In a case where only the positioning accuracy of the rear GNSS receiver 5D is reduced, the positioning module 5F calculates the current position of the vehicle body 1 based on the front antenna position measured by the front GNSS receiver 5C. Accordingly, the positioning module 5F can calculate the current position of the vehicle body 1 with high accuracy. Further, the automated driving control part 40 can make the work vehicle V perform automated driving according to the target path P, based on the highly accurate current position of the vehicle body 1, etc., which are calculated by the positioning module 5F.

For example, the current position of the vehicle body 1 calculated by the positioning module 5F can be set in a variety of ways, such as to the front end position at the center with respect to the left-right direction on the upper end of the vehicle body 1, the rear end position at the center with respect to the left-right direction on the upper end of the vehicle body 1, the middle position with respect to the front-rear direction at the center with respect to the left-right direction on the upper end of the vehicle body 1, the central position of the vehicle body 1, the position at the center of gravity of the vehicle body 1, the central position of turning in a spin-turning state, etc.

The positioning module 5F executes the direction calculation control in which the current direction of the vehicle body 1 is calculated based on the front and rear antenna positions measured by the front and rear GNSS receivers 5C and 5D.

As an explanation of the control operation of the positioning module 5F in the direction calculation control based on the flowchart of FIG. 10 and FIG. 11 to FIG. 13, the positioning module 5F firstly performs the coordinate conversion process (Step #1) in which the front and rear antenna positions p1 and p2 that are measured by the GNSS receivers 5C and 5D, respectively, are converted into the NED coordinate system where either one of the front and rear antenna positions (here, the rear antenna position p2) is the origin. Next, the positioning module 5F performs the tilt calculation process (Step #2, see FIG. 11) in which the tilt θL of the straight line L connecting the antennas is calculated with the X-axis (north: N) being 0 degrees, based on the difference Δx in the X-direction and the difference Δy in the Y-direction of the front antenna position p1 relative to the rear antenna position p2 in the NED coordinate system. Further, the positioning module 5F performs the tilt offset amount calculation process (Step #3, see FIG. 12) in which the tilt offset amount Δθ between the antennas in a case where the vehicle body 1 is facing true north (N) is calculated based on the positional relationship between the front and rear GNSS antennas 5A and 5B, which is stored in a non-volatile memory of the automated driving control part 40. Then, the positioning module 5F performs the direction calculation process (Step #4, see FIG. 13) in which the direction θv of the vehicle body 1 is calculated based on the difference between the tilt θL of the straight line L, which is obtained in the tilt calculation process, and the tilt offset amount Δθ between the antennas, which is obtained in the tilt offset amount calculation process.

In other words, in this work vehicle V, the positioning module 5F calculates the current direction of the vehicle body 1 based on the front and rear antenna positions, so that, unlike the case where the current direction of the vehicle body 1 is calculated based on a single antenna position, it is not necessary to calculate movement vectors of the vehicle body 1 in the process of calculating the current direction. Therefore, the current direction of the vehicle body 1 can be calculated with high accuracy even at the time of turning driving with a small turning radius, where it is difficult to calculate movement vectors of the vehicle body 1, and at the time where the driving of the vehicle body 1 is stopped, where movement vectors of the vehicle body 1 cannot be calculated.

In a case where the start of automated driving is commanded by a user's touch operation on the display device 3A of the mobile communication terminal 3, the automated driving control part 40 executes the automated driving control for making the vehicle body 1 (work vehicle V) perform automated driving according to the target path P, based on the target path P for spraying work which is stored in a non-volatile memory, positioning information which is obtained from the positioning module 5F, etc.

The automated driving control includes the command process for the engine, in which a control command related to the engine 12 is transmitted to the engine control part 41, the command process for an HST, in which a control command related to the HST 30 is transmitted to the HST control part 42, the command process for work, in which a control command related to the spray device 4 is transmitted to the work device control part 43, etc.

In the command process for the engine, the automated driving control part 40 transmits, to the engine control part 46A, an engine rotational speed changing command, etc., as an instruction for changing the engine rotational speed, based on the set engine rotational speed included in the target path P. The engine control part 46A executes the engine rotational speed control, etc., for changing the engine rotational speed in response to an engine rotational speed changing command transmitted from the automatic driving control part 46F.

In the command process for an HST, the automated driving control part 40 transmits, to the HST control part 42, a driving state switching command as an instruction for switching the driving states based on the driving state of the vehicle body 1 which is included in the target path P, a vehicle speed changing command as an instruction for changing the vehicle speed based on the set vehicle speed which is included in the target path P, etc. The HST control part 42 executes the driving state switching control for controlling the operation of each HST 30 in response to a driving state switching command which is transmitted from the automated driving control part 40, a vehicle speed control for controlling the operation of each HST 30 in response to a vehicle speed changing command which is transmitted from the automated driving control part 40, etc.

In the command process for work, the automated driving control part 40 transmits, to the work device control part 43, a spraying pattern switching command as an instruction for switching the spraying patterns of the left and right liquid spray parts 4L and 4R based on the spraying patterns included in the respective work paths Pw of the target path P, a spraying starting command as an instruction for starting spraying a chemical or the like with the left and right liquid spray parts 4L and 4R based on the working start position included in the target path P, a spraying stopping command as an instruction for stopping spraying a chemical or the like with the left and right liquid spray parts 4L and 4R based on the working stop position included in the target path P, etc. The work device control part 43 executes the spraying control for controlling the state of spraying a chemical or the like with the left and right liquid spray parts 4L and 4R by controlling the operation of the valve unit 4G in response to the spraying pattern switching command, the spraying starting command, the spraying stopping command, or the like which is transmitted from the automated driving control part 40.

As the work path Pw, it is possible to select the four-direction spraying path Pw1 in which the four-direction spraying pattern is set as the spraying pattern, the left-side three-direction spraying path (an example of the direction-limited spraying path) Pw2 in which the left-side three-direction spraying pattern is set as the spraying pattern, the right-side three-direction spraying path (an example of the direction-limited spraying path) Pw3 in which the right-side three-direction spraying pattern is set as the spraying pattern, and the two-direction spraying path (an example of the direction-limited spraying path) Pw4 in which the two-direction spraying pattern is set as the spraying pattern.

Although illustration in a drawing is omitted, the vehicle body 1 is equipped with various kinds of detection devices such as the first rotation sensor for detecting the output rotational speed of the engine 12, the left and right second rotation sensors for detecting the output rotational speed of the hydraulic motor 30B in each HST 30, the first remaining amount sensor for detecting the remaining amount of a chemical or the like in the storage tank 4A, and the second remaining amount sensor for detecting the remaining amount of fuel in the fuel tank 26.

Figure 14:
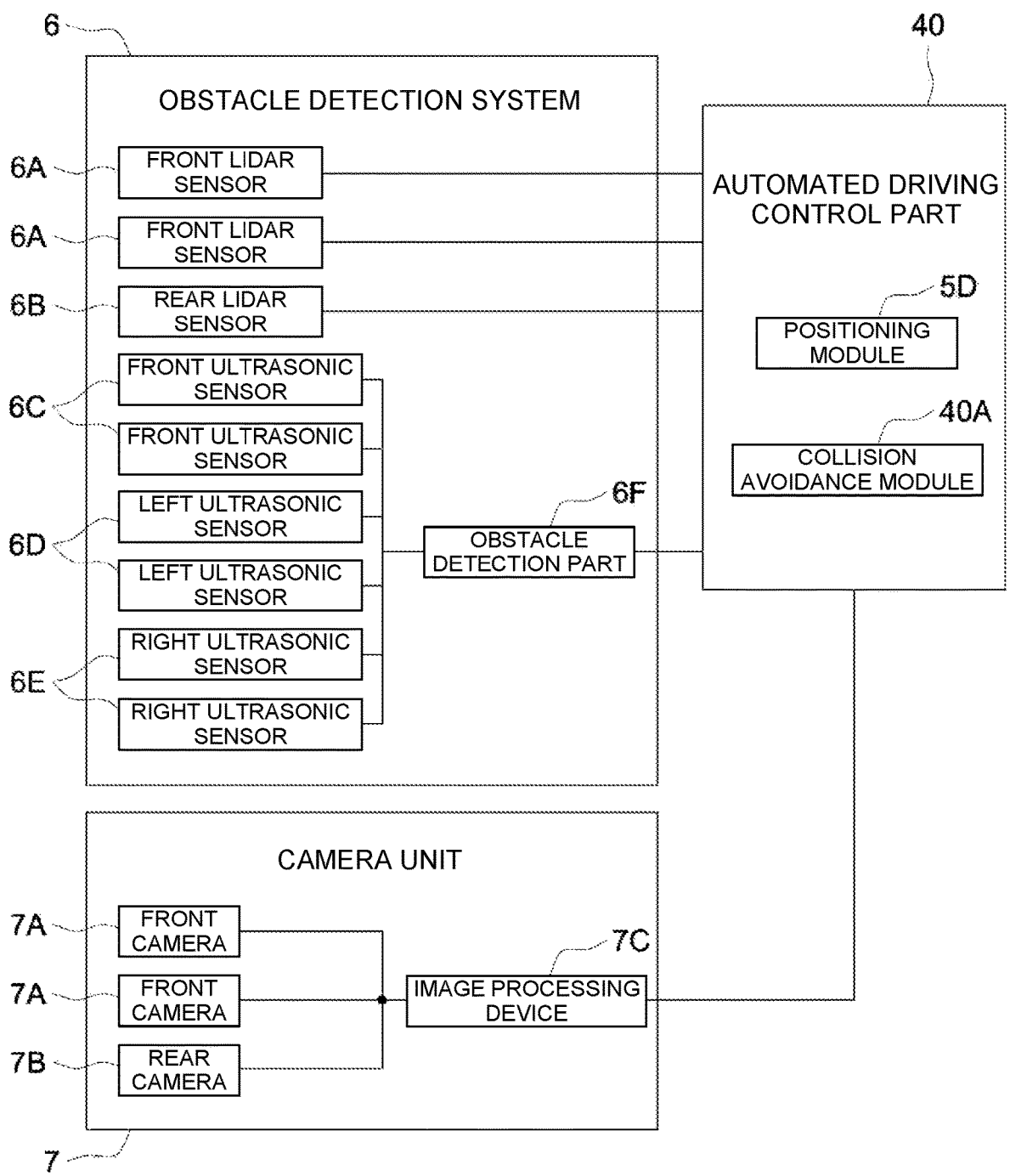
FIG. 14 is a block diagram illustrating a schematic configuration of a camera unit, etc.

As illustrated in FIG. 14, the obstacle detection system 6 includes the left and right front LiDAR sensors 6A and the single rear LiDAR sensor 6B. As illustrated in FIG. 3 to FIG. 4 and FIG. 6, of the left and right front LiDAR sensors 6A, the front LiDAR sensor 6A on the left side is arranged at the left-side front end part on the ceiling part of the vehicle body 1 and in a front-lowering posture so as to look down the front left side of the vehicle body 1 from the diagonally upper side. Accordingly, for the front LiDAR sensor 6A on the left side, a predetermined range on the front left side of the vehicle body is set as its measurement range. As illustrated in FIG. 3 to FIG. 4 and FIG. 7, the front LiDAR sensor 6A on the right side is arranged at the right-side front end part on the ceiling part of the vehicle body 1 and in a front-lowering posture so as to look down the front right side of the vehicle body 1 from the diagonally upper side. Accordingly, for the front LiDAR sensor 6A on the right side, a predetermined range on the front right side of the vehicle body is set as its measurement range. As illustrated in FIG. 5 to FIG. 7, the rear LiDAR sensor 6B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear LiDAR sensor 6B, a predetermined range on the rear side of the vehicle body is set as its measurement range.

Each of the LiDAR sensors 6A and 6B measures the distance from the respective LiDAR sensor 6A or 6B to each measurement point (measurement target object) in the measurement range by the TOF (Time Of Flight) method, in which the distance to the measurement point is measured based on the round-trip time for an emitted laser beam to return after reaching the measurement point. Each of the LiDAR sensors 6A and 6B performs scanning with a laser beam horizontally and vertically at high speed across the entire measurement range, respectively, so as to sequentially measure the distance to the measurement point at each scan angle (coordinates). Each of the LiDAR sensors 6A and 6B generates a distance image and extracts a group of measurement points that is estimated as an obstacle, based on measurement information such as the measured distance to each measurement point and the scan angle (coordinates) for each measurement point, in order to transmit the measurement information related to the extracted group of measurement points to the automated driving control part 40 as measurement information related to an obstacle.

As illustrate in FIG. 14, the obstacle detection system 6 includes the left and right front ultrasonic sensors 6C, the front and rear left ultrasonic sensors 6D, the front and rear right ultrasonic sensors 6E, and the single obstacle detection part 6F. As illustrated in FIG. 3 to FIG. 4 and FIG. 6 to FIG. 7, the left and right front ultrasonic sensors 6C are arranged at the left and right front end parts of the vehicle body 1 in a forward-facing posture. Accordingly, for the left and right front ultrasonic sensors 6C, predetermined left and right ranges on the front side of the vehicle body are set as their measurement ranges. As illustrated in FIG. 3, the front and rear left ultrasonic sensors 6D are arranged at the front and rear left end parts of the vehicle body 1 in a leftward-facing posture. Accordingly, for the front and rear left ultrasonic sensors 6D, predetermined front and rear ranges on the left outer side of the vehicle body 1 are set as their measurement ranges. The front and rear right ultrasonic sensors 6E are arranged at the front and rear right end parts of the vehicle body 1 in a rightward-facing posture. Accordingly, for the front and rear right ultrasonic sensors 6E, predetermined front and rear ranges on the right outer side of the vehicle body 1 are set as their measurement ranges.

The obstacle detection part 6F judges whether or not a measurement target object is present in the measurement ranges of the respective ultrasonic sensors 6C to 6E, based on transmission and reception of ultrasonic waves by the respective ultrasonic sensors 6C to 6E. The obstacle detection part 6F measures the distance from the respective ultrasonic sensors 6C to 6E to a measurement target object by the TOF (Time Of Flight) method, in which the distance to the measurement point is measured based on the round-trip time for an emitted ultrasonic wave to return after reaching the measurement point. The obstacle detection part 6F transmits the measured distance to the measurement target object and the direction of the measurement target object to the automated driving control part 40 as measurement information related to an obstacle.

Each of the LiDAR sensors 6A and 6B and the obstacle detection part 6F includes an electronic control unit in which a microcontroller or the like is mounted, various kinds of control programs stored in a non-volatile memory (e.g., an EEPROM such as a flash memory) of the microcontroller, etc. Each of the LiDAR sensors 6A and 6B and the obstacle detection part 6F is connected to the automated driving control part 40 via CAN so as to be capable of performing mutual communication.

As illustrated in FIG. 2 and FIG. 14, the automated driving control part 40 includes the collision avoidance module 40A that avoids the possibility that the work vehicle V collides with an obstacle, based on measurement information related to an obstacle, which is obtained from the respective LiDAR sensors 6A and 6B and the obstacle detection part 6F.

As illustrated in FIG. 14, the camera unit 7 is equipped with the left and right front cameras 7A which capture images of the front side of the vehicle body 1, the single rear camera 7B which captures an image of the rear side of the vehicle body 1, and the image processing device 7C which processes the images obtained from each of the cameras 7A and 7B. As illustrated in FIG. 3 to FIG. 4, FIG. 6, and FIG. 8, of the left and right front cameras 7A, the front camera 7A on the left side is arranged at the left-side front end part on the ceiling part of the vehicle body 1 and in a front-lowering posture so as to look down the front left side of the vehicle body 1 from the diagonally upper side. Accordingly, for the front camera 7A on the left side, a predetermined range on the front left side of the vehicle body is set as its image-capturing range. As illustrated in FIG. 3 to FIG. 4 and FIG. 7 to FIG. 8, the front camera 7A on the right side is arranged at the right-side front end part on the ceiling part of the vehicle body 1 and in a front-lowering posture so as to look down the front right side of the vehicle body 1 from the diagonally upper side. Accordingly, for the front camera 7A on the right side, a predetermined range on the front right side of the vehicle body is set as its image-capturing range. As illustrated in FIG. 5 to FIG. 8, the rear camera 7B is arranged at the rear end part at the center with respect to the left-right direction on the ceiling part of the vehicle body 1 and in a rear-lowering posture so as to look down the rear side of the vehicle body 1 from the diagonally upper side. Accordingly, for the rear camera 7B, a predetermined range on the rear side of the vehicle body is set as its image-capturing range.

The image processing device 7C includes an electronic control unit in which a microcontroller or the like is mounted, various kinds of control programs stored in a non-volatile memory (e.g., an EEPROM such as a flash memory) of the microcontroller, etc. On the image processing device 7C, a learning process for recognizing fruit trees, etc., in an orchard is performed. The image processing device 7C is connected to the automated driving control part 40 via CAN so as to be capable of performing mutual communication. The image processing device 7C processes information obtained from each of the cameras 7A and 7B, so as to generate a left front image of the vehicle body, a right front image of the vehicle body, and a rear image of the vehicle body, etc., and transmit them to the automated driving control part 40. The automated driving control part 40 transfers each of the transmitted images to the terminal control part 3B of the mobile communication terminal 3. Accordingly, it is possible to display the left front image of the vehicle body, the right front image of the vehicle body, the rear image of the vehicle body, etc., on the display device 3A of the mobile communication terminal 3. Then, the user can easily grasp the situation on the front side of the vehicle body and the situation on the rear side of the vehicle body by looking at each image displayed on the display device 3A.

Note that it is also possible that the camera unit 7 is included in the obstacle detection system 6. In this case, the detection of obstacles can be performed with high accuracy, based on information related to an obstacle which is obtained from the respective ultrasonic sensors 6C to 6E and the respective LiDAR sensors 6A and 6B with high positioning accuracy as well as information related to an obstacle which is obtained from the camera unit 7 with high accuracy of object determination.

That is, the above-described automated driving unit 2 includes the positioning unit 5, the obstacle detection system 6, the camera unit 7, the automated driving control part 40, the engine control part 41, the HST control part 42, the work device control part 43, etc. Further, with proper operation of these, it is possible to make the work vehicle V perform automated driving with accuracy according to the target path P, and it is also possible for the spray device 4 to properly perform the work of spraying a chemical or the like.

Figure 15:
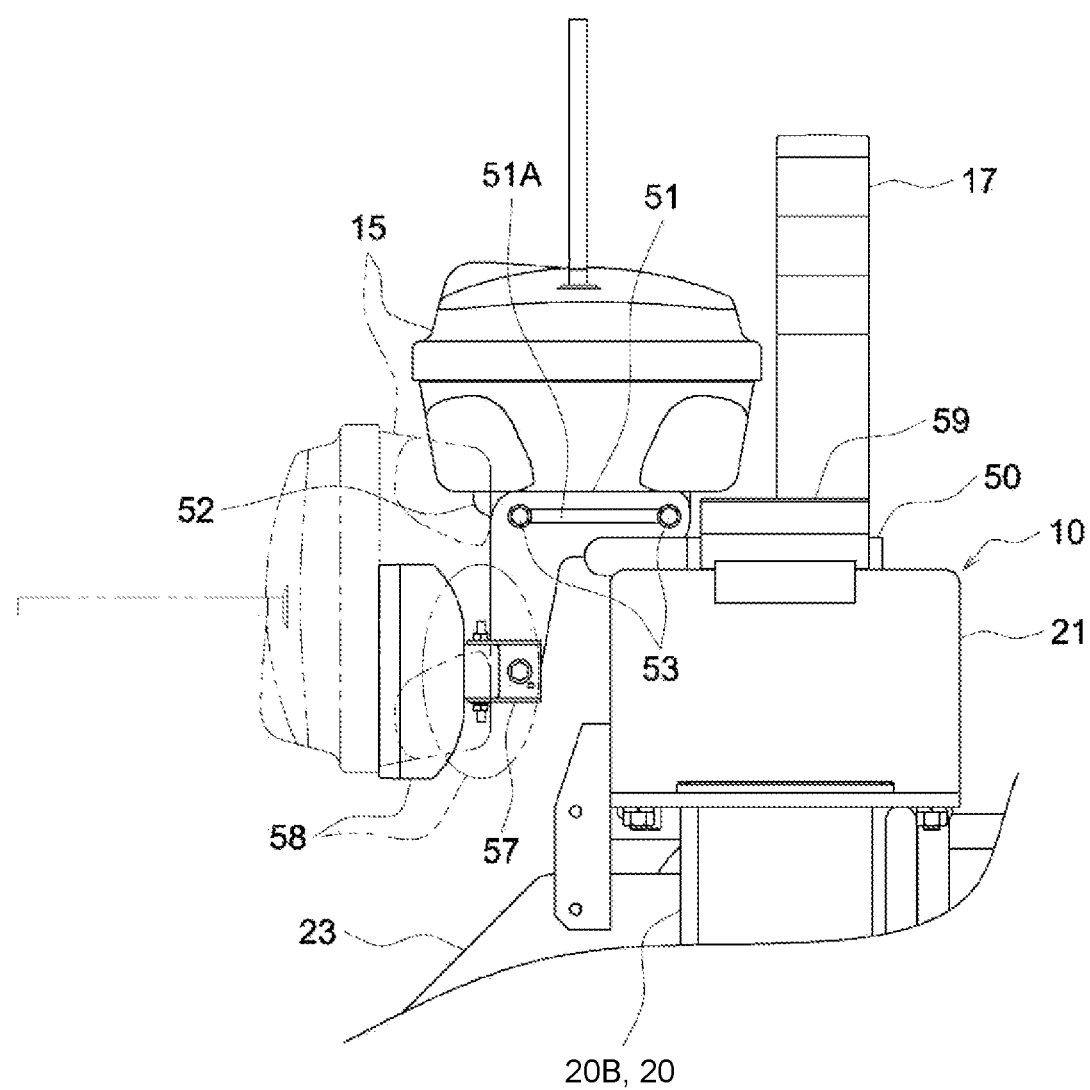
FIG. 15 is a side view of a main part illustrating a using position and a retracted position of an antenna unit.
Figure 16:
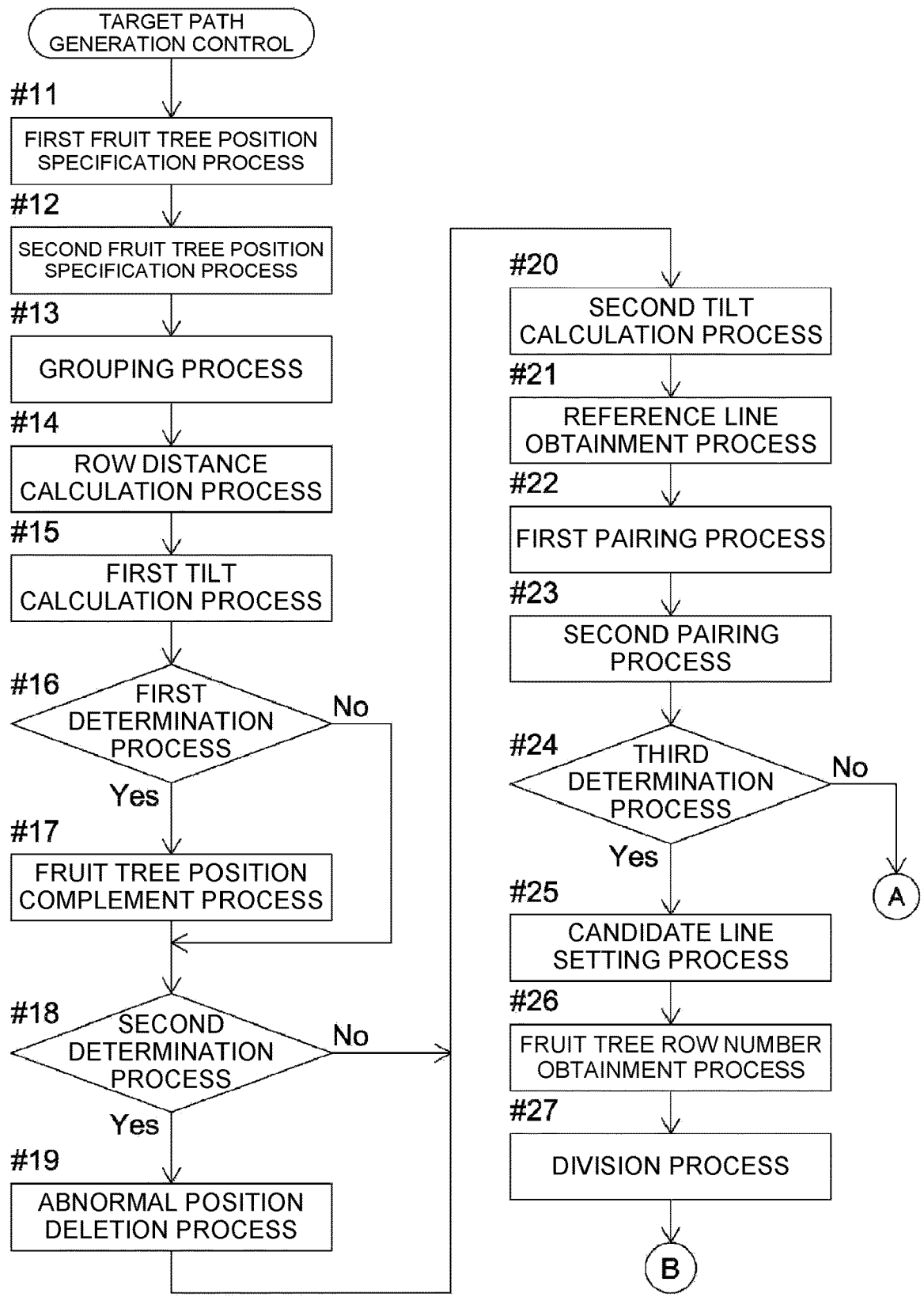
FIG. 16 is a flowchart of target path generation control.
Figure 17:
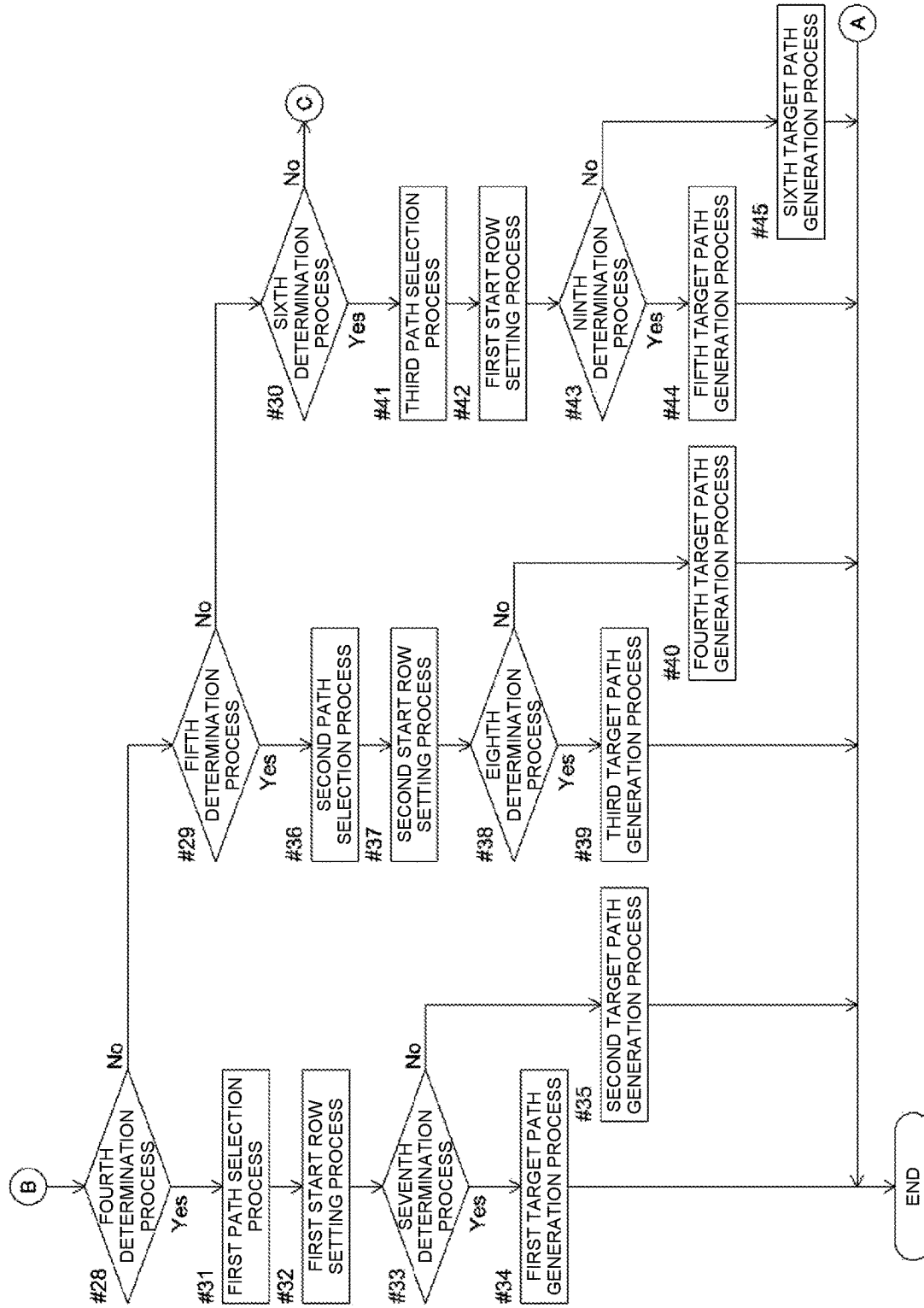
FIG. 17 is a flowchart of the target path generation control.
Figure 18:
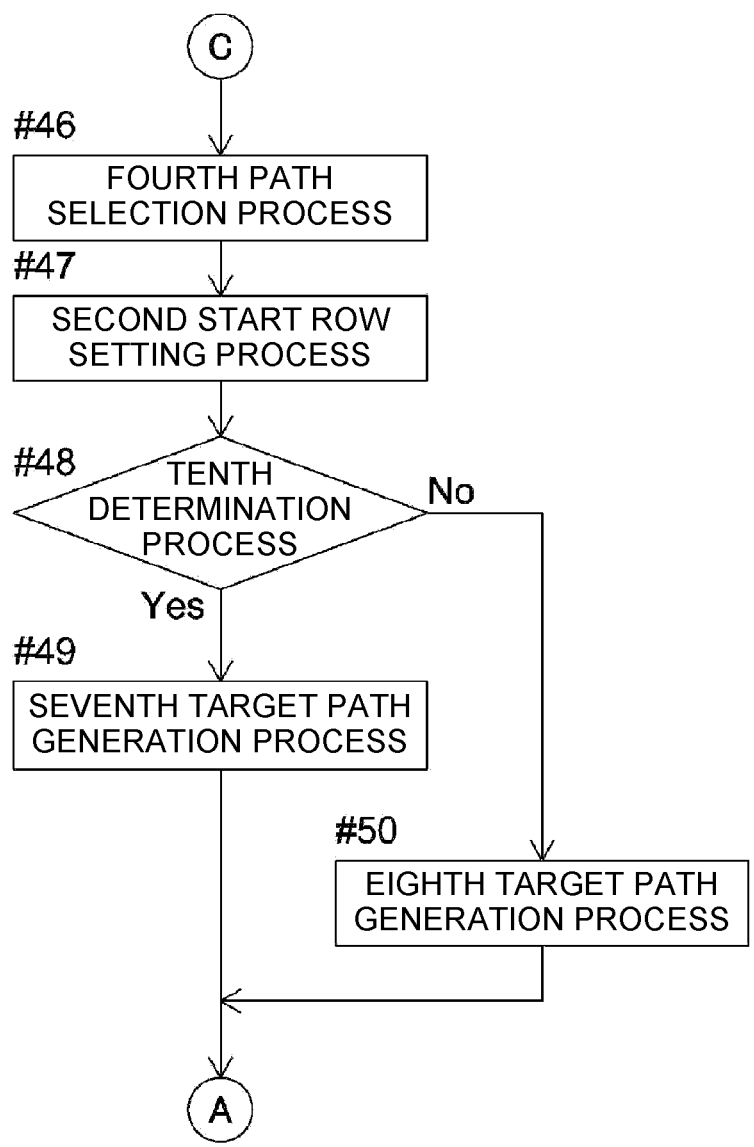
FIG. 18 is a flowchart of the target path generation control.

As illustrated in FIG. 3 to FIG. 4, FIG. 8, and FIG. 15, the support member 50, which has a U-shape in plan view and supports the front antenna unit 15, is attached to the front cross member 21 of the vehicle body frame 10. As illustrated in FIG. 4 and FIG. 15, the support member 50 includes left and right support plates 51 formed in a downward-facing L-shape in a side view. As illustrated in FIG. 15, in the upper end part of each of the support plates 51, the long hole 51A is formed so as to extend in the front-rear direction of the vehicle body. To the respective support plates 51, the left and right brackets 52 arranged at the bottom part of the front antenna unit 15 are connected via the front-rear pair of bolts 53, etc., by utilizing those long holes 51A. With this configuration, by loosening the connection with each of the support plates 51 via the rear bolt 53, etc., after releasing the connection with each of the support plates 51 via the front bolt 53, etc., it is possible to reposition the front antenna unit 15 from the using position above the vehicle body, which is indicated with the solid lines in FIG. 15, to the retracted position in the front of the vehicle body, which is indicated with the dashed-two-dotted lines in FIG. 15.

As illustrated in FIG. 3 and FIG. 5 to FIG. 8, the support member 54, which has a U-shape in plan view and supports the rear antenna unit 16, is attached to the rear cross member 22 of the vehicle body frame 10. As illustrated in FIG. 5 to FIG. 7, the support member 54 includes left and right support plates 55 formed in a downward-facing L-shape in a side view. In the upper end part of each of the support plates 55, the long hole 55A is formed so as to extend in the front-rear direction of the vehicle body. To the respective support plates 55, left and right brackets (not illustrated in the drawings) arranged at the bottom part of the rear antenna unit 16 are connected via the front-rear pair of bolts 56, etc., by utilizing those long holes 55A. With this configuration, by loosening the connection with each of the support plates 55 via the rear bolt 56 etc., after releasing the connection with each of the support plates 55 via the rear bolt 56, etc., it is possible to reposition the rear antenna unit 16 from the using position above the vehicle body to the retracted position in the rear of the vehicle body.

As illustrated in FIG. 3 to FIG. 4, FIG. 8, and FIG. 15, the left and right front lights 58 are attached to the front lower part of the left and right support plates 51 via the left and right support brackets 57. The left and right support brackets 57 are connected to the left and right support plates 51 via bolts in a state of being able to adjust the angles thereof in the up-down direction. The left and right front lights 58 are connected to the left and right support brackets 57 via bolts in a state of being able to swing and change the position thereof in the left-right direction. With this configuration, it is possible for the left and right front lights 58 to adjust their lighting direction in the up-down direction and the left-right direction. Further, as illustrated in FIG. 15, in a case of repositioning the front antenna unit 15 from the using position, which is indicated with the solid lines in FIG. 15, to the retracted position, which is indicated with the dashed-two-dotted lines in FIG. 15, the front antenna unit 15 can be avoided from interfering with the left and right front lights 58 by repositioning the left and right front lights 58 from the forward-facing using position to the laterally-outward-facing retracted position.

As illustrated in FIG. 3 to FIG. 6, FIG. 8, and FIG. 15, the bracket 59 to which the above-described indicator light 17 is detachably attached is connected to the left side of the support member 50.

With the above-described configuration, in this work vehicle V, by changing the position of each of the antenna units 15 and 16 from the using position to the retracted position and removing the indicator light 17 from the bracket 59, it is possible to suppress occurrence of such an inconvenience that each of the antenna units 15 and 16 and the indicator light 17 make contact with other objects and get damaged in a case where the work vehicle V is retracted in a storage or the like or transported by a transport vehicle or the like.

As illustrated in FIG. 3 and FIG. 5 to FIG. 8, the left and right combination lamps 60 having stop lamps and back lamps are attached to the left and right support plates 55. The left and right combination lamps 60 are arranged in such positions so as not to interfere with the repositioning of the above-described rear antenna unit 16.

As illustrated in FIG. 3 to FIG. 4, FIG. 6, and FIG. 8, on the left side of the vehicle body 1, the power source switch 61 for controlling on/off of the power supply from the battery 13 to each electrical component such as each of the control parts 40 to 43 is attached to the bracket 59 that supports the indicator light 17. The step 62 for enabling the user to ride while standing is attached to the support plate 27 on the left side. The left cover member 18 is equipped with the upper cover 18A (see FIG. 3), which is positioned at the middle part of the left cover member 18 with respect to the front-rear direction so as to be swingable for opening and closing in the up-down direction. Further, the left side interior of the vehicle body 1 is equipped with the cross-swing-type operation lever 63 (see FIG. 6) which can be manually operated in a case where the upper cover 18A is held in the open position. The operation lever 63 is connected to the automated driving control part 40 via a sensor unit (not illustrated in the drawings), etc., which detects the operation direction and operation amount thereof. The automated driving control part 40 transmits the switching of the driving states of the vehicle body 1 to the HST control part 42 in accordance with the operation direction and operation amount of the operation lever 63, which are transmitted from the sensor unit. The HST control part 42 controls operation of each HST 30 in accordance with the switching of the driving states, which is transmitted from the automated driving control part 40.

That is, the user can stand on the step 62 of this work vehicle V so as to easily operate the power source switch 61. Further, the user can stand on the step 62 in a state where the upper cover 18A is held in the open position, so as to be capable of manual moving/driving by utilizing the operation lever 63.

As illustrated in FIG. 2, the terminal control part 3B includes the display control part 3Ba which controls the display device 3A, etc., in relation to a display or notification, the target path generation part 3Bb which generates the target path P (see FIG. 9) for spraying work on the fruit trees Z that are aligned in multiple rows, etc. The display control part 3Ba and the target path generation part 3Bb are structured with various kinds of control programs, etc., which are stored in a non-volatile memory of the terminal control part 3B.

The target path generation part 3Bb starts the target path generation control for generating the target path P for spraying work in a case where the target path generation mode is selected by a touch operation of the user on the display device 3A.

Hereinafter, based on the flowcharts of FIG. 16 to FIG. 18 and FIG. 19 to FIG. 29, the control operation of the target path generation part 3Bb in the target path generation control will be explained.

Figure 19:
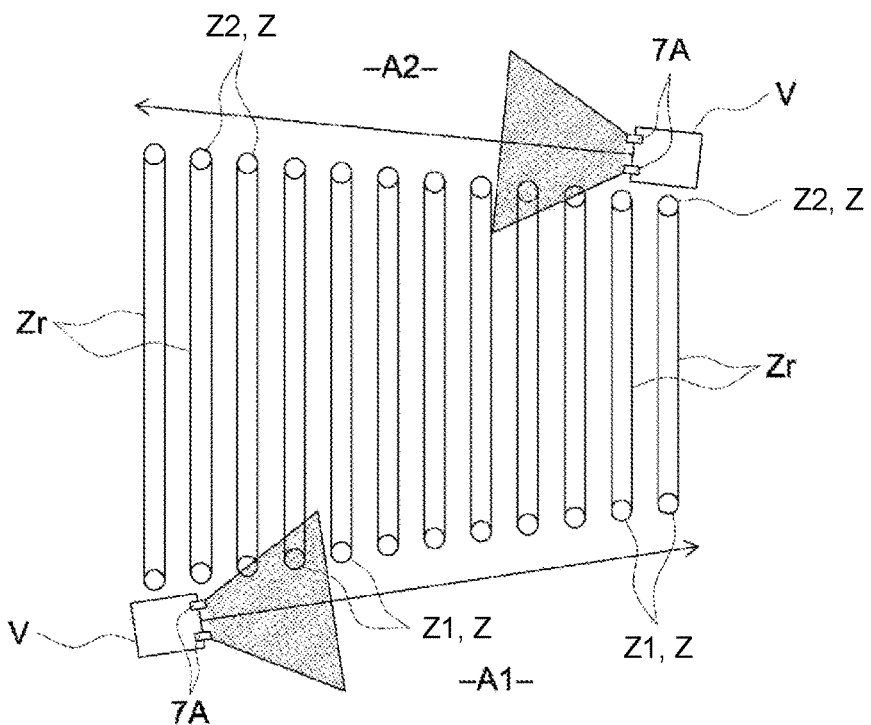
FIG. 19 is an explanatory diagram related to a fruit tree position specification process.

As illustrated in FIG. 19, if a manual driving of the work vehicle V is performed along the periphery of an orchard in which multiple fruit trees Z are planted side by side in multiple rows, the target path generation part 3Bb performs the first fruit tree position specification process (Step #11) in which the position (coordinates) of the fruit tree Z located at the outer end in each fruit tree row Zr existing in the first area A1 is specified as the first fruit tree position (first spray target object position) Z1, based on positioning information obtained from the positioning unit 5 and image information obtained from the left and right front cameras 7A of the camera unit 7, in a case where the work vehicle V drives in the first area A1 of the orchard in which one end sides of the respective fruit tree rows (spray target rows) Zr are aligned. Further, the target path generation part 3Bb performs the second fruit tree position specification process (Step #12) in which the position (coordinates) of the fruit tree Z located at the outer end in each fruit tree row Zr existing in the second area A2 is specified as the second fruit tree position (second spray target object position) Z2, based on positioning information obtained from the positioning unit 5 and image information obtained from the left and right front cameras 7A of the camera unit 7, in a case where the work vehicle V drives in the second area A2 of the orchard in which the other end sides of the respective fruit tree rows Zr are aligned.

Figure 20:
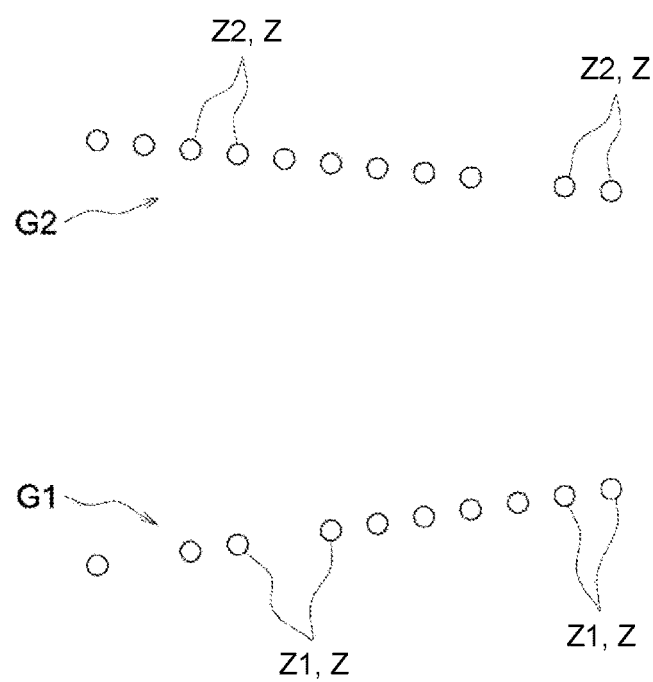
FIG. 20 is an explanatory diagram related to a grouping process.

After performing each of the fruit tree position specification processes, as illustrated in FIG. 20, the target path generation part 3Bb performs the grouping process (Step #13) in which the specified respective first fruit tree positions Z1 are grouped as the first group G1 and the specified respective second fruit tree positions Z2 are grouped as the second group G2.

Figure 21:
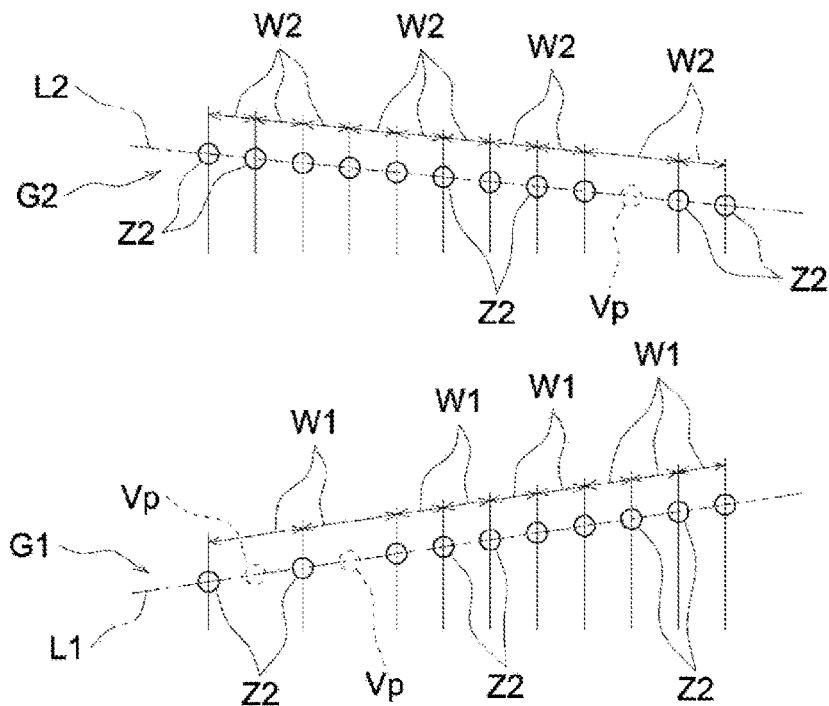
FIG. 21 is an explanatory diagram related to a fruit tree position complement process.

After performing the grouping process, as illustrated in FIG. 21, the target path generation part 3Bb performs the row distance calculation process, in which the row distances W1 and W2 between the respective fruit tree positions Z1 or Z2 in each area A1 or A2 are calculated from the respective fruit tree positions Z1 and Z2 in each group G1 or G2, and performs the first tilt calculation process, in which each of the in-group straight lines L1 and L2 that connect the respective fruit tree positions Z1 or Z2 in each group G1 or G2 are generated and the tilts of the respective in-group straight lines L1 and L2 are calculated (Steps #14-15). Then, the target path generation part 3Bb performs the first determination process (Step #16), in which whether or not there is an absence of the respective fruit tree positions Z1 and Z2 in each fruit tree position specification process is determined based on the row distances W1 and W2 of the respective fruit tree positions Z1 or Z2 that are obtained in the row distance calculation process and the tilts of the respective in-group straight lines L1 and L2 that are obtained in the first tilt calculation process, and performs the fruit tree position complement process (Step #17), in which, in a case where there is an absence in the first determination process, a virtual point Vp is inserted to the position of the absence so as to complement the absent fruit tree position Z1 or Z2.

Figure 22:
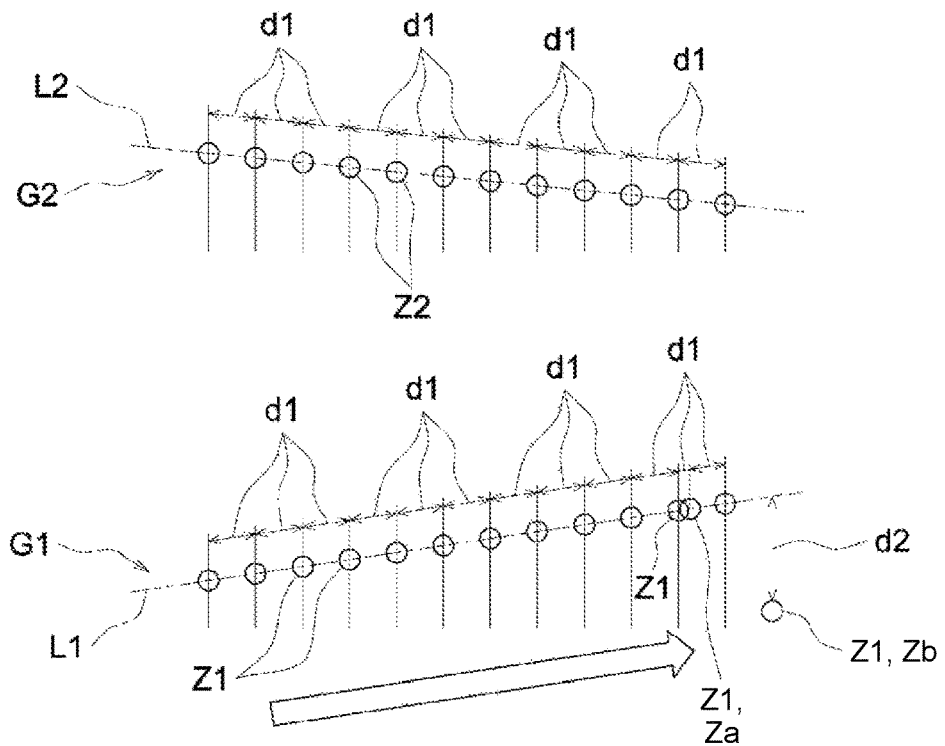
FIG. 22 is an explanatory diagram related to an abnormal position deletion process.

After performing the fruit tree position complement process, as illustrated in FIG. 22, the target path generation part 3Bb performs the second determination process (Step #18), in which whether or not an abnormal fruit tree position Za or Zb is included in the respective fruit tree positions Z1 and Z2 that are specified in each fruit tree position specification process, and performs the abnormal position deletion process (Step #19), in which, in a case where an abnormal fruit tree position Za or Zb is included, the abnormal fruit tree position Za or Zb is deleted. Specifically, in the second determination process, as illustrated in FIG. 22, the target path generation part 3Bb performs the abnormality determination in the sort order (the order indicated with the arrow in FIG. 22) on the respective fruit tree positions Z1 and Z2, which are sorted based on the distances from reference positions in each of the groups G1 and G2. Then, in a case where the distance d1 from an already-determined fruit tree position Z1 or Z2 to the next fruit tree position Z1 or Z2 is equal to or lower than the first predetermined value, the target path generation part 3Bb determines that the next fruit tree position Z1 or Z2 (the fruit tree position Za illustrated in FIG. 22) is abnormal. Further, in a case where there is a fruit tree position Z1 or Z2 whose distance d2 from each in-group straight line L1 or L2, which is obtained in the first tilt calculation process, is equal to or more than the second predetermined value, the target path generation part 3Bb determines that the fruit tree position Z1 or Z2 (the fruit tree position Zb illustrated in FIG. 22) is abnormal. Then, the target path generation part 3Bb deletes those abnormal fruit tree positions Za and Zb in the abnormal position deletion process.

Figure 23:
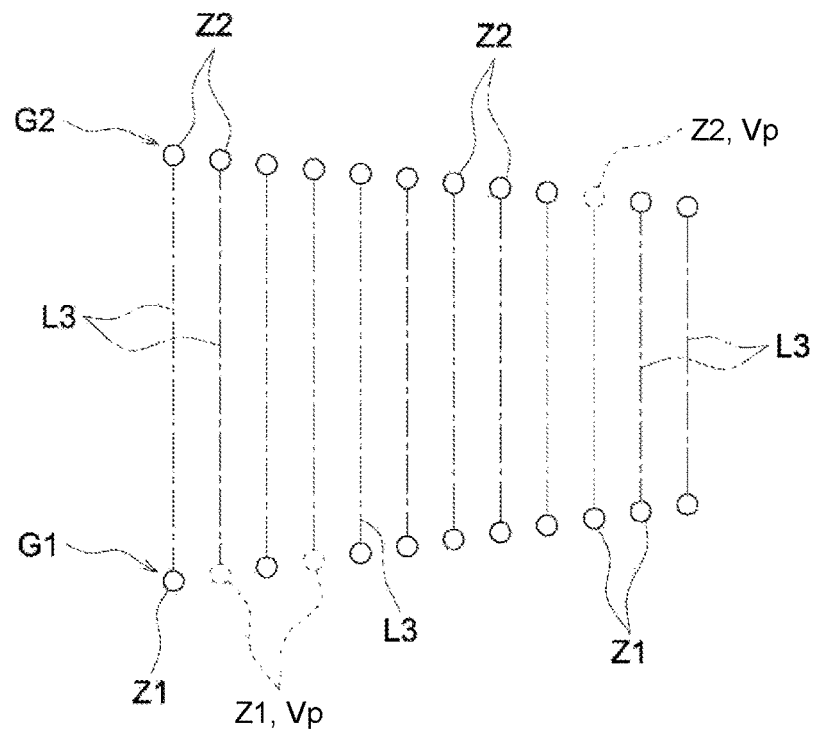
FIG. 23 is an explanatory diagram related to a reference line obtainment process.

After performing the abnormal position deletion process, as illustrated in FIG. 23, the target path generation part 3Bb performs the second tilt calculation process (Step #20), in which the respective inter-group straight lines L3 that connect opposing fruit tree positions Z1 and Z2 of the respective first fruit tree positions Z1 in the first group G1 and the respective second fruit tree positions Z2 in the second group G2 are generated in order to calculate the average tilt of the respective inter-group straight lines L3, and performs the reference line obtainment process (Step #21), in which the reference line L4 for pairing which has the average tilt (see FIG. 24) is obtained.

Figure 24:
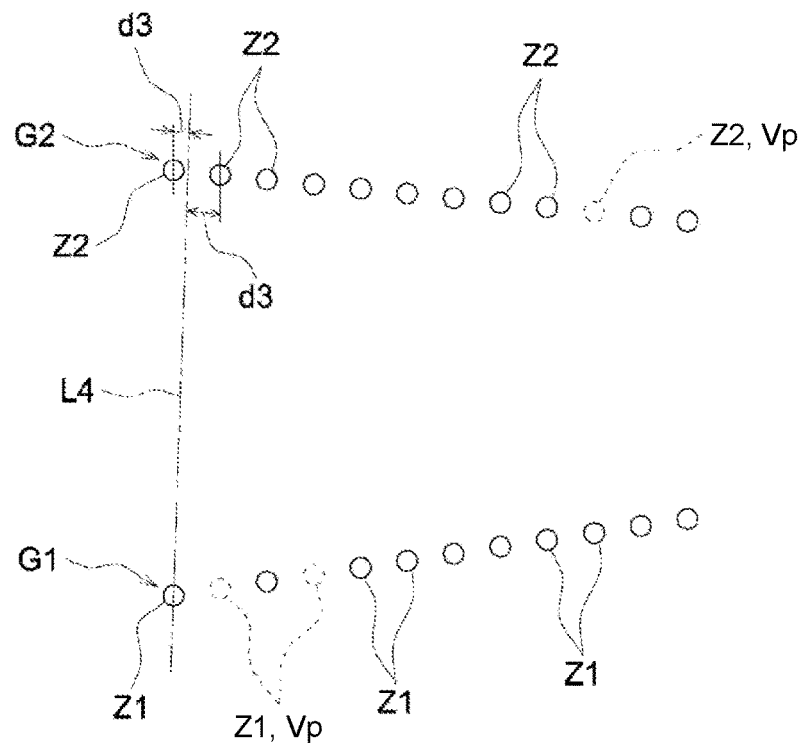
FIG. 24 is an explanatory diagram related to a pairing process.

After performing the reference line obtainment process, the target path generation part 3Bb performs the first pairing process, in which the respective second fruit tree positions Z2 of the second group G2 are paired with the respective first fruit tree positions Z1 of the first group G1, and the second pairing process, in which the respective first fruit tree positions Z1 of the first group G1 are paired with the second fruit tree positions Z2 of the second group G2 (Steps #22-23). Specifically, in the first pairing process, as illustrated in FIG. 24, the target path generation part 3Bb generates the reference line L4 whose origin is a given first fruit tree position Z1 of the first group G1 and extracts the respective second fruit tree positions Z2 of the second group G2 that exist within the third predetermined value from this reference line L4, so that the second fruit tree position Z2 whose distance d3 from the respective extracted second fruit tree position Z2 to the reference line L4 is shortest is paired with the first fruit tree position Z1 that is the origin of the reference line L4. Further, this pairing is performed for all the first fruit tree positions Z1 of the first group G1. Further, in the second pairing process, the target path generation part 3Bb performs pairing similar to the first pairing process for all the second fruit tree positions Z2 of the second group G2 such that the respective second fruit tree position Z2 of the second group G2 is set as the origin.

Figure 25:
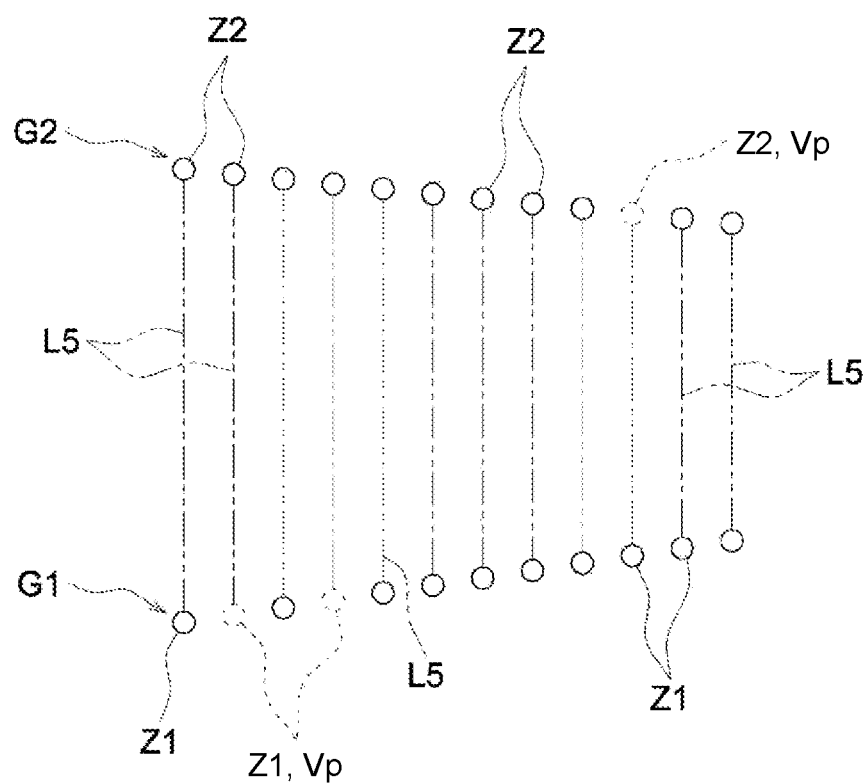
FIG. 25 is an explanatory diagram related to a fruit tree row number obtainment process.

After performing each pairing process, the target path generation part 3Bb performs the third determination process (Step #24), in which whether or not those pairing results are the same is determined, and the candidate line setting process (Step #25), in which, in a case where the pairing results are the same, it is determined that the pairing is successful, and, as illustrated in FIG. 25, the multiple straight lines that connect the paired first fruit tree positions Z1 and second fruit tree positions Z2 are set as the candidate lines L5 of the work paths (spraying paths) Pw. Accordingly, the target path generation part 3Bb can set multiple candidate lines L5 of the work paths Pw corresponding to the respective fruit tree rows Zr of the orchard. In a case where the pairing results of the respective pairing processes are not the same, the target path generation part 3Bb determines that the pairing is not successful, and the target path generation control is ended.

After performing the candidate line setting process, the target path generation part 3Bb performs the fruit tree row number obtainment process (Step #26), in which the number of fruit tree rows Zr in the orchard is obtained from the number of set candidate lines L5 of the work paths Pw, and performs the division process (Step #27), in which the obtained number of fruit tree rows Zr is divided by "4", which is the maximum number of spray directions of the left and right liquid spray parts 4L and 4R. Further, the target path generation part 3Bb performs the fourth determination process to determine whether or not the number of remainder rows in the division process is zero, the fifth determination process to determine whether or not the number of remainder rows is one, and the sixth determination process to determine whether or not the number of remainder rows is two (Steps #28-30).

Figure 26:
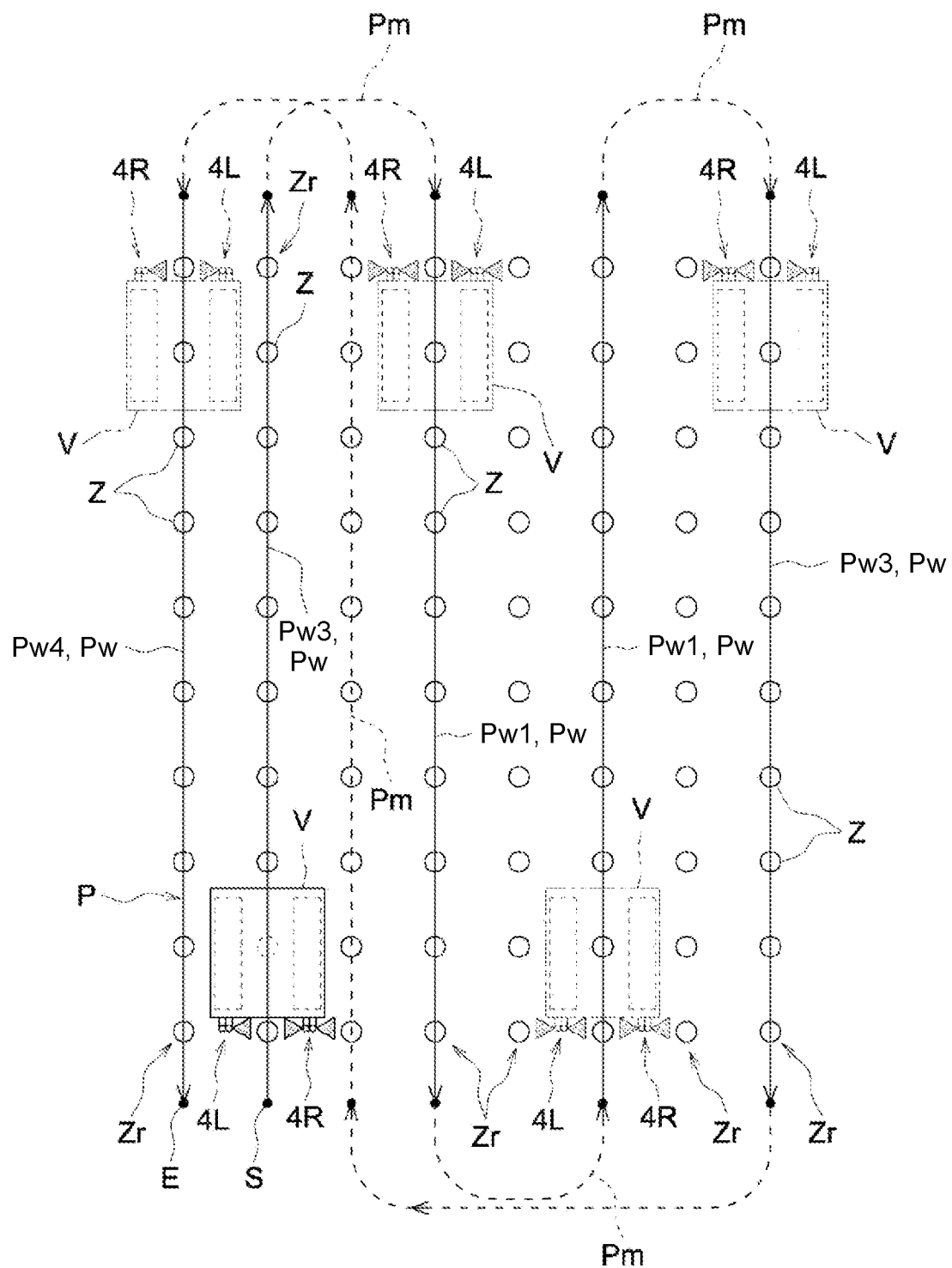
FIG. 26 is a plan view illustrating an example of a target path for 8 rows (4n rows).

In a case where the number of remainder rows is zero in the fourth determination process, that is, in a case where the number of fruit tree rows Zr is 4n rows, such as the 8 rows illustrated in FIG. 26, the target path generation part 3Bb performs the first path selection process (Step #31), in which the four-direction spraying path Pw1, the left-side three-direction spraying path Pw2 or right-side three-direction spraying path Pw3, and the two-direction spraying path Pw4 are selected as the work path Pw, and, since the number of fruit tree rows Zr is an even number, the target path generation part 3Bb performs the first start row setting process (Step #32), in which the second fruit tree row Zr from an outer end is set as the spraying-start row. Thereafter, the target path generation part 3Bb performs the seventh determination process (Step #33), in which whether or not the start point position S of the target path P that is set by the user is on the left side of the orchard is determined.

In a case where the start point position S of the target path P is on the left side in the seventh determination process, the target path generation part 3Bb performs the first target path generation process (Step #34) to generate the target path P for left 4n rows (for example, the target path P illustrated in FIG. 26) in which the start point position S and end point position E are set on the left side of the orchard, and, thereafter, the target path generation control is ended. In a case where the start point position S of the target path P is on the right side in the seventh determination process, the target path generation part 3Bb performs the second target path generation process (Step #35) to generate the target path P for right 4n rows, which is a left-right reversal of the target path P for left 4n rows that is illustrated in FIG. 26, for example, and thereafter, the target path generation control is ended.

Figure 27:
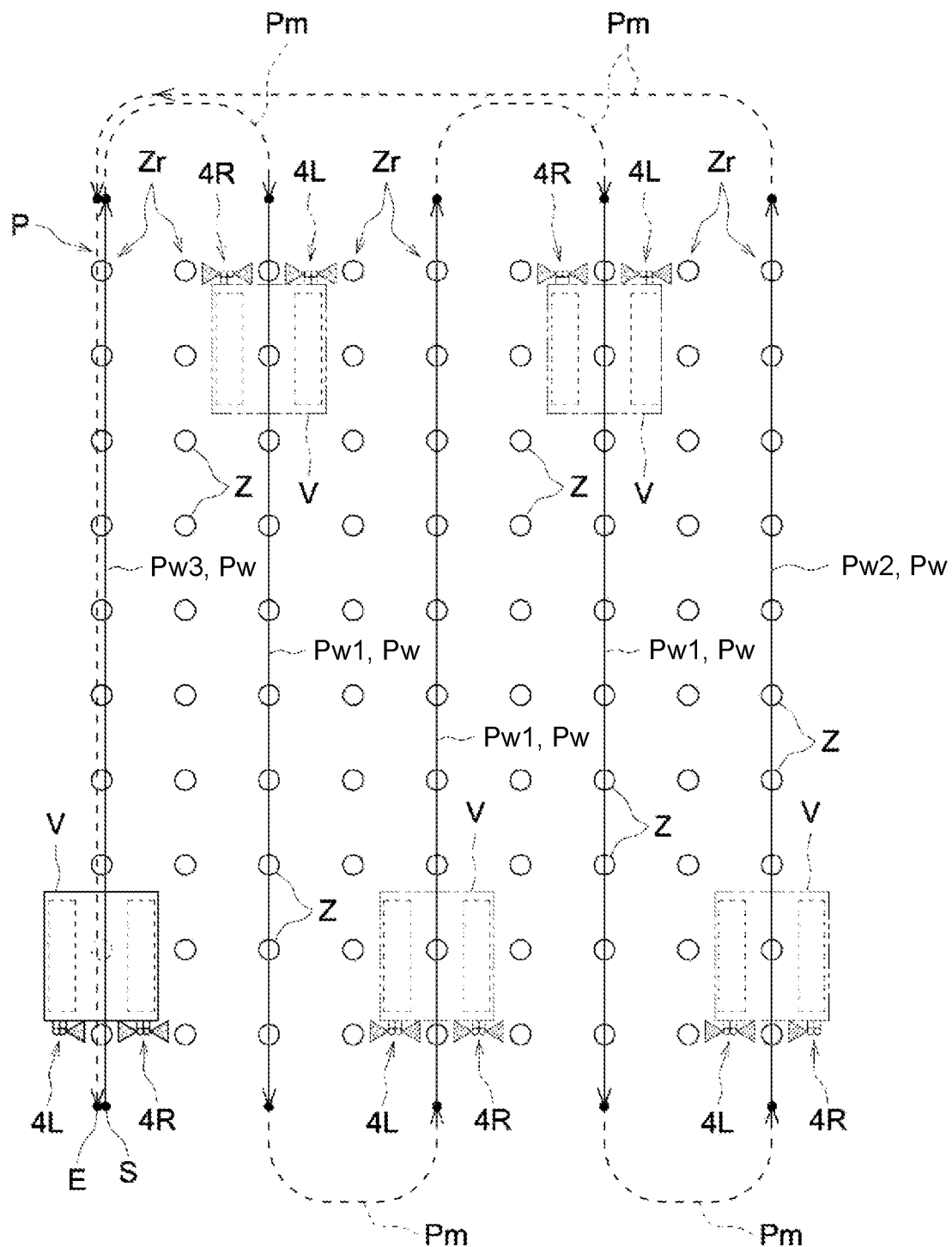
FIG. 27 is a plan view illustrating an example of a target path for 9 rows (4n+1 rows).

In a case where the number of remainder rows is one in the fifth determination process, that is, in a case where the number of fruit tree rows Zr is 4n+1 rows, such as the 9 rows illustrated in FIG. 27, the target path generation part 3Bb performs the second path selection process (Step #36), in which the four-direction spraying path Pw1, the left-side three-direction spraying path Pw2, and the right-side three-direction spraying path Pw3 are selected as the work path Pw, and, since the number of fruit tree rows Zr is an odd number, the target path generation part 3Bb performs the second start row setting process (Step #37), in which the fruit tree row Zr at an outer end is set as the spraying-start row. Thereafter, the target path generation part 3Bb performs the eighth determination process (Step #38), in which whether or not the start point position S of the target path P that is set by the user is on the left side of the orchard is determined.

In a case where the start point position S of the target path P is on the left side in the eighth determination process, the target path generation part 3Bb performs the third target path generation process (Step #39) to generate the target path P for left 4n+1 rows (for example, the target path P illustrated in FIG. 27) in which the start point position S and end point position E are set on the left side of the orchard, and, thereafter, the target path generation control is ended. In a case where the start point position S of the target path P is on the right side in the eighth determination process, the target path generation part 3Bb performs the fourth target path generation process (Step #40) to generate the target path P for right 4n+1 rows, which is a left-right reversal of the target path P for left 4n+1 rows that is illustrated in FIG. 27, for example, and thereafter, the target path generation control is ended.

Figure 28:
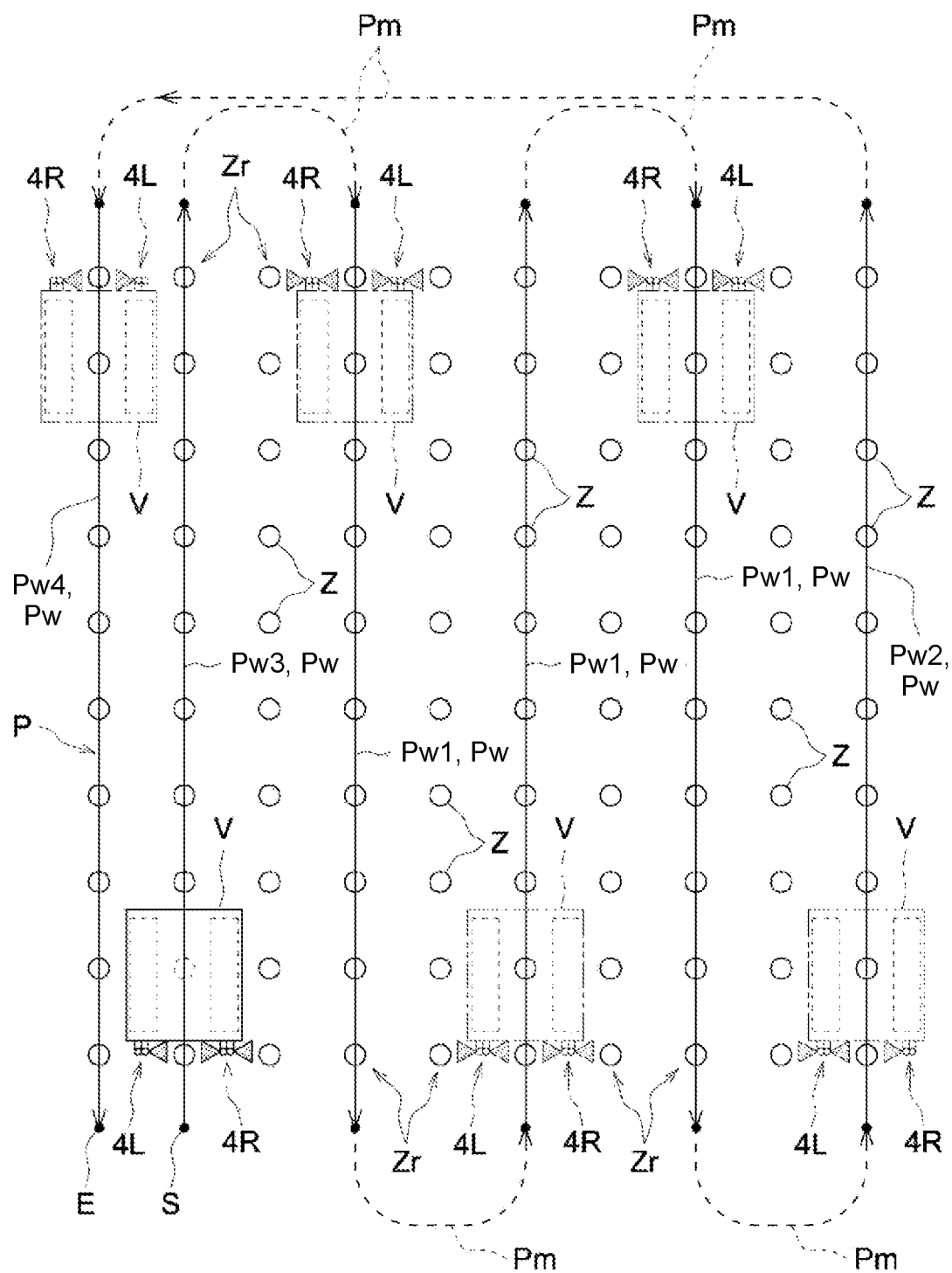
FIG. 28 is a plan view illustrating an example of a target path for 10 rows (4n+2 rows).

In a case where the number of remainder rows is two in the sixth determination process, that is, in a case where the number of fruit tree rows Zr is 4n+2 rows, such as the 10 rows illustrated in FIG. 28, the target path generation part 3Bb performs the third path selection process (Step #41), in which the four-direction spraying path Pw1, the left-side three-direction spraying path Pw2, the right-side three-direction spraying path Pw3, and the two-direction spraying path Pw4 are selected as the work path Pw, and, since the number of fruit tree rows Zr is an even number, the target path generation part 3Bb performs the first start row setting process (Step #42), in which the second fruit tree row Zr from an outer end is set as the spraying-start row. Thereafter, the target path generation part 3Bb performs the ninth determination process (Step #43), in which whether or not the start point position S of the target path P that is set by the user is on the left side of the orchard is determined.

In a case where the start point position S of the target path P is on the left side in the ninth determination process, the target path generation part 3Bb performs the fifth target path generation process (Step #44) to generate the target path P for left 4n+2 rows (for example, the target path P illustrated in FIG. 28) in which the start point position S and end point position E are set on the left side of the orchard, and, thereafter, the target path generation control is ended. In a case where the start point position S of the target path P is on the right side in the ninth determination process, the target path generation part 3Bb performs the sixth target path generation process (Step #45) to generate the target path P which is a left-right reversal of the target path P for 4n+2 rows that is illustrated in FIG. 28, for example, and, thereafter, the target path generation control is ended.

Figure 29:
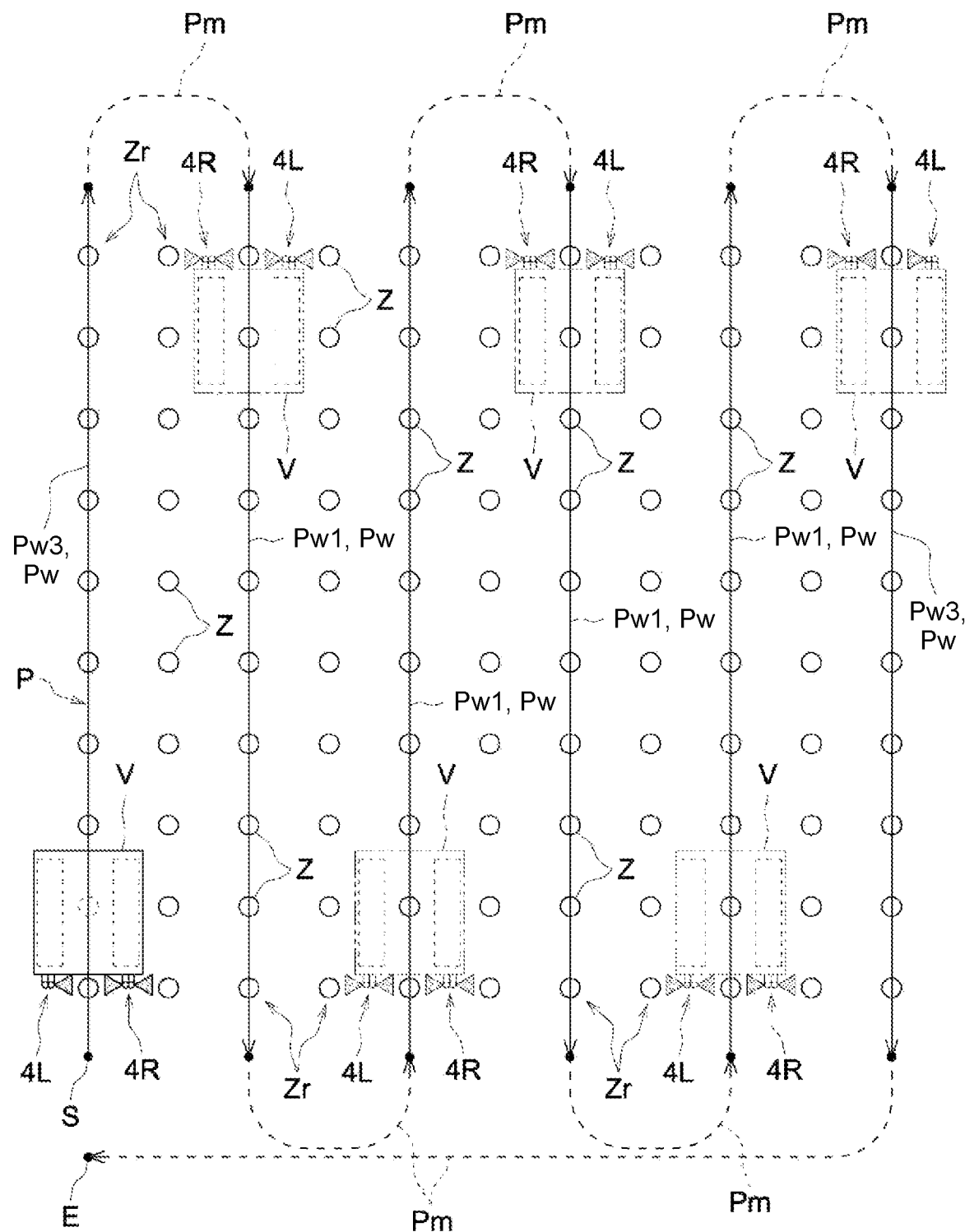
FIG. 29 is a plan view illustrating an example of a target path for 11 rows (4n+3 rows).

In a case where the number of remainder rows is three in the sixth determination process, that is, in a case where the number of fruit tree rows Zr is 4n+3 rows, such as the 11 rows illustrated in FIG. 29, the target path generation part 3Bb performs the fourth path selection process (Step #46), in which the four-direction spraying path Pw1 and the left-side three-direction spraying path Pw2 or right-side three-direction spraying path Pw3 are selected as the work path Pw, and, since the number of fruit tree rows Zr is an odd number, the target path generation part 3Bb performs the second start row setting process (Step #47), in which the fruit tree row Zr at an outer end is set as the spraying-start row. Thereafter, the target path generation part 3Bb performs the tenth determination process (Step #48), in which whether or not the start point position S of the target path P that is set by the user is on the left side of the orchard is determined.

In a case where the start point position S of the target path P is on the left side in the tenth determination process, the target path generation part 3Bb performs the seventh target path generation process (Step #49) to generate the target path P for left 4n+3 rows (for example, the target path P illustrated in FIG. 29) in which the start point position S and end point position E are set on the left side of the orchard, and, thereafter, the target path generation control is ended. In a case where the start point position S of the target path P is on the right side in the tenth determination process, the target path generation part 3Bb performs the eighth target path generation process (Step #50) to generate the target path P for right 4n+3 rows, which is a left-right reversal of the target path P for left 4n+3 rows that is illustrated in FIG. 29, for example, and, thereafter, the target path generation control is ended.

That is, in a case where the number of fruit tree rows Zr is 8, the target path generation part 3Bb generates the target path P for 8 rows (see FIG. 26), which includes two four-direction spraying paths Pw1, two left-side three-direction spraying paths Pw2 or right-side three-direction spraying paths Pw3, and one two-direction spraying path Pw4. Further, two four-direction spraying paths Pw1 are added for each additional 4 rows of fruit trees Zr, so that the target path P for 4n rows is generated.

In a case where the number of fruit tree rows Zr is 9, the target path generation part 3Bb generates the target path P for 9 rows (see FIG. 27), which includes three four-direction spraying paths Pw1, one left-side three-direction spraying path Pw2, and one right-side three-direction spraying path Pw3. Further, two four-direction spraying paths Pw1 are added for each additional 4 rows of fruit trees Zr, so that the target path P for 4n+1 rows is generated.

In a case where the number of fruit tree rows Zr is 10, the target path generation part 3Bb generates the target path P for 10 rows (see FIG. 28), which includes three four-direction spraying paths Pw1, one left-side three-direction spraying path Pw2, one right-side three-direction spraying path Pw3, and one two-direction spraying path Pw4. Further, two four-direction spraying paths Pw1 are added for each additional 4 rows of fruit trees Zr, so that the target path P for 4n+2 rows is generated.

In a case where the number of fruit tree rows Zr is 11, the target path generation part 3Bb generates the target path P for 11 rows (see FIG. 29), which includes four four-direction spraying paths Pw1 and two left-side three-direction spraying paths Pw2 or right-side three-direction spraying paths Pw3. Further, two four-direction spraying paths Pw1 are added for each additional 4 rows of fruit trees Zr, so that the target path P for 4n+3 rows is generated.

As clarified in the explanation above, in this automated driving system for spraying work, the target path generation part 3Bb generates the target path P with a path setting which includes the four-direction spraying path Pw1, in which the four-direction spraying pattern is set as the spraying pattern, and the direction-limited spraying paths Pw2 to Pw4, in which direction-limited spraying patterns whose spraying directions are limited to three or less directions are set as the spraying pattern. More specifically, based on the number of fruit tree rows Zr in the orchard, the target path generation part 3Bb generates the target path P which is proper to the number of fruit tree rows Zr in the orchard with a path setting in which, from among the four-direction spraying path Pw1, the left-side three-direction spraying path Pw2, the right-side three-direction spraying path Pw3, and the two-direction spraying path Pw4 whose spraying patterns are different from each other, multiple paths are selected and combined as the respective work paths (spraying paths) Pw included in the target path P.

Accordingly, while reducing the number of work paths (spraying paths) Pw relative to the number of fruit tree rows Zr, it is possible to perform the spraying of a chemical or the like on every single fruit tree included in each of the fruit tree rows Zr with the left and right liquid spray parts 4L and 4R such that wasteful spraying and duplicated spraying are avoided. Further, since the number of work paths Pw is reduced, the number of move paths Pm that connect the respective work paths Pw is also reduced, and, thus, the total length of the target path P is shortened, and the driving distance of the work vehicle V is shortened. Further, since the number of work paths Pw is reduced, the interval between work paths Pw becomes wider, and, accordingly, the radius of the turn paths Pmt included in the move paths Pm connecting adjacent work paths Pw can be made larger, so that the followability of the work vehicle V on the turn paths Pmt can be improved. As a result, while avoiding wasteful consumption of fuel, chemicals, or the like, it is possible to properly and efficiently perform the spraying work on trees aligned in multiple rows during automated driving of the work vehicle V on the target path P with high followability.

Further, since the end point position E of the target path P is set to be the same position as or a position nearby the start point position S of the target path P, the work vehicle V returns to the start point position S of the target path P or to the position nearby there at the time of ending the automated driving. Accordingly, it is not necessary for the user to perform manual driving to return the work vehicle V to the start point position S of the target path P, the burden on the user can be reduced.

Further, since the target path generation part 3Bb immediately determines a proper spraying-start row for performing the spraying work during automated driving of the work vehicle V, based on the number of fruit tree rows Zr in an orchard, it is possible to quickly make the work vehicle V perform automated driving toward the spraying-start row, and it is possible to quickly start the spraying work during automated driving of the work vehicle V. As a result, the spraying work during automated driving of the work vehicle V can be performed more efficiently.

Further, in generating the target path P, the target path generation part 3Bb specifies the first fruit tree position Z1 at an outer end of each fruit tree row Zr in the first area A1 in which one ends of the respective fruit tree rows Zr are aligned, specifies the second fruit tree position Z2 at an outer end of each fruit tree row Zr in the second area A2 in which the other ends of the respective fruit tree rows Zr are aligned, and specifies the second fruit tree positions Z2 corresponding to the respective first fruit tree positions Z1, in order to set multiple straight lines connecting corresponding first fruit tree positions Z1 and second fruit tree positions Z2 as the candidate lines L5 of the spraying paths Pw to Pw4.

Accordingly, in generating the respective spraying paths Pw1 to Pw4, it is not necessary to make the target path generation part 3Bb specify the positions of all fruit trees Z. As a result, the generation of the target path P for spraying work by the target path generation part 3Bb can be easier.

Further, for example, in a case where there is an absence of any one of the second fruit tree positions Z2 corresponding to the respective first fruit tree positions Z1, the target path generation part 3Bb sets the virtual second fruit tree position Z2 (Vp) corresponding to the first fruit tree position Z1, based on the row distances W2 of the respective fruit trees Z in the second area A2, and sets the straight line connecting the corresponding first fruit tree position Z1 and virtual second fruit tree position Z2 (Vp) as one of the candidate lines L5 of the spraying paths Pw to Pw4. Further, in a case where there is an absence of any one of the first fruit tree positions Z1 corresponding to the respective second fruit tree positions Z2, the target path generation part 3Bb sets the virtual first fruit tree position Z1 (Vp) corresponding to the second fruit tree position Z2, based on the row distances W1 of the respective fruit trees Z in the first area A1, and sets the straight line connecting the corresponding second fruit tree position Z2 and virtual first fruit tree position Z1 (Vp) as one of the candidate lines L5 of the spraying paths Pw to Pw4.

Accordingly, it is possible to properly set the candidate lines L5 of the respective spraying paths Pw to Pw4 without a need for specifying the respective first fruit tree positions Z1 in the first area A1 or the respective second fruit tree positions Z2 in the second area A2 again. Accordingly, the generation of the target path P for spraying work by the target path generation part 3Bb can be easier.

In the meantime, as for the above-described first fruit tree position specification process and second fruit tree position specification process, it is also possible that, based on a touch operation of the user performed on the display device 3A of the mobile communication terminal 3, the target path generation part 3Bb specifies the position (coordinates) of the fruit tree Z located at the outer end of each fruit tree row Zr existing in the first area A1 as the first fruit tree position (first spray target object position) Z1 and specifies the position (coordinates) of the fruit tree Z located at the outer end of each fruit tree row Zr existing in the second area A2 as the second fruit tree position (second spray target object position) Z2.

Figure 30:
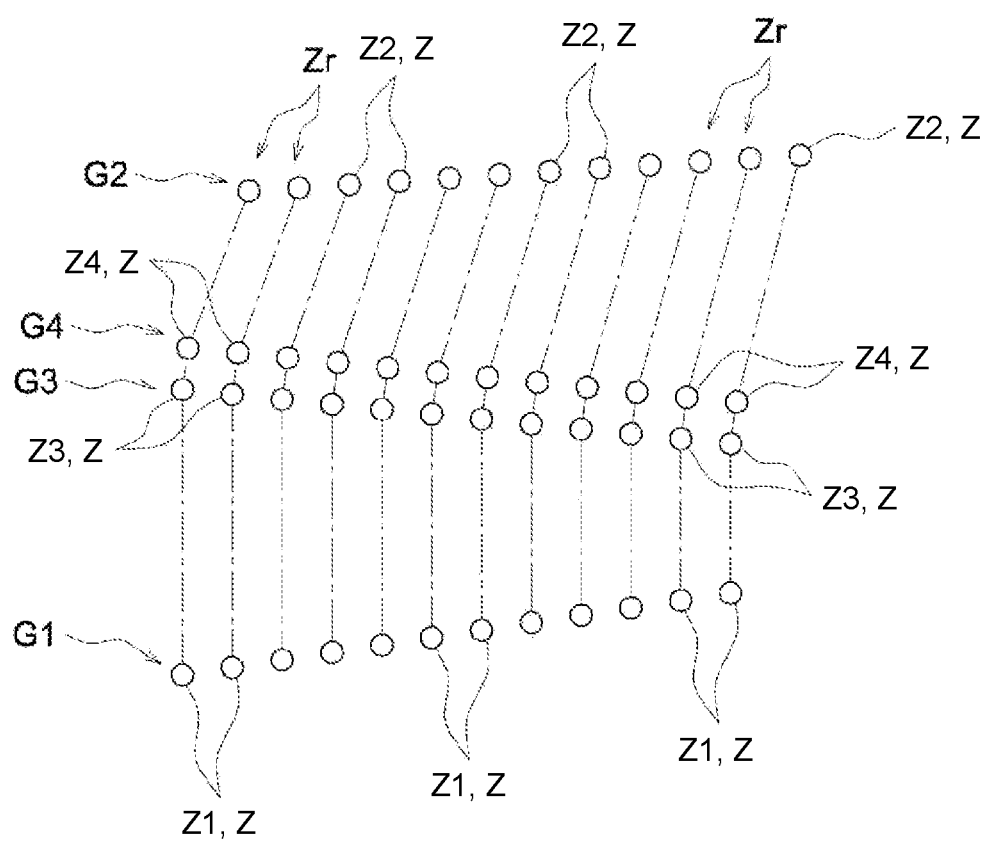
FIG. 30 is an explanatory diagram related to a fruit tree position specification process, etc., to be performed on each fruit tree row having a curved point in the middle.

Further, for example, as illustrated in FIG. 30, in a case where each fruit tree row Zr is not a straight line but has a curved point in the middle, if the positions (coordinates) of the fruit trees Z located at the curved points in each fruit tree row Zr are specified as the third fruit tree position Z3 or fourth fruit tree position Z4 and each of the specified third fruit tree position Z3 and fourth fruit tree position Z4 is grouped as the third group G3 or fourth group G4 so that the subsequent row distance calculation process, etc., to be performed on the respective fruit tree positions Z1 to Z4 of the respective groups G1 to G4 are performed in the same procedures as in the case where the respective fruit tree rows Zr are straight, it is possible for the target path generation part 3Bb to easily generate the target path P for spraying work even in such a case where the respective fruit tree rows Zr include curved points in the middle.

Further, in a case where the number of fruit tree rows Zr in the orchard is equal to or more than 16, it is also possible that the target path generation part 3Bb combines the above-described eight kinds of target paths P, i.e., the target path P for left 4n, the target path P for left 4n+1, the target path P for left 4n+2, the target path P for left 4n+3, the target path P for right 4n, the target path P for right 4n+1, the target path P for right 4n+2, and the target path P for right 4n+3, so as to generate the target path P that is proper to the orchard in which the number of fruit tree rows Zr is equal to or more than 16.

Figure 31:
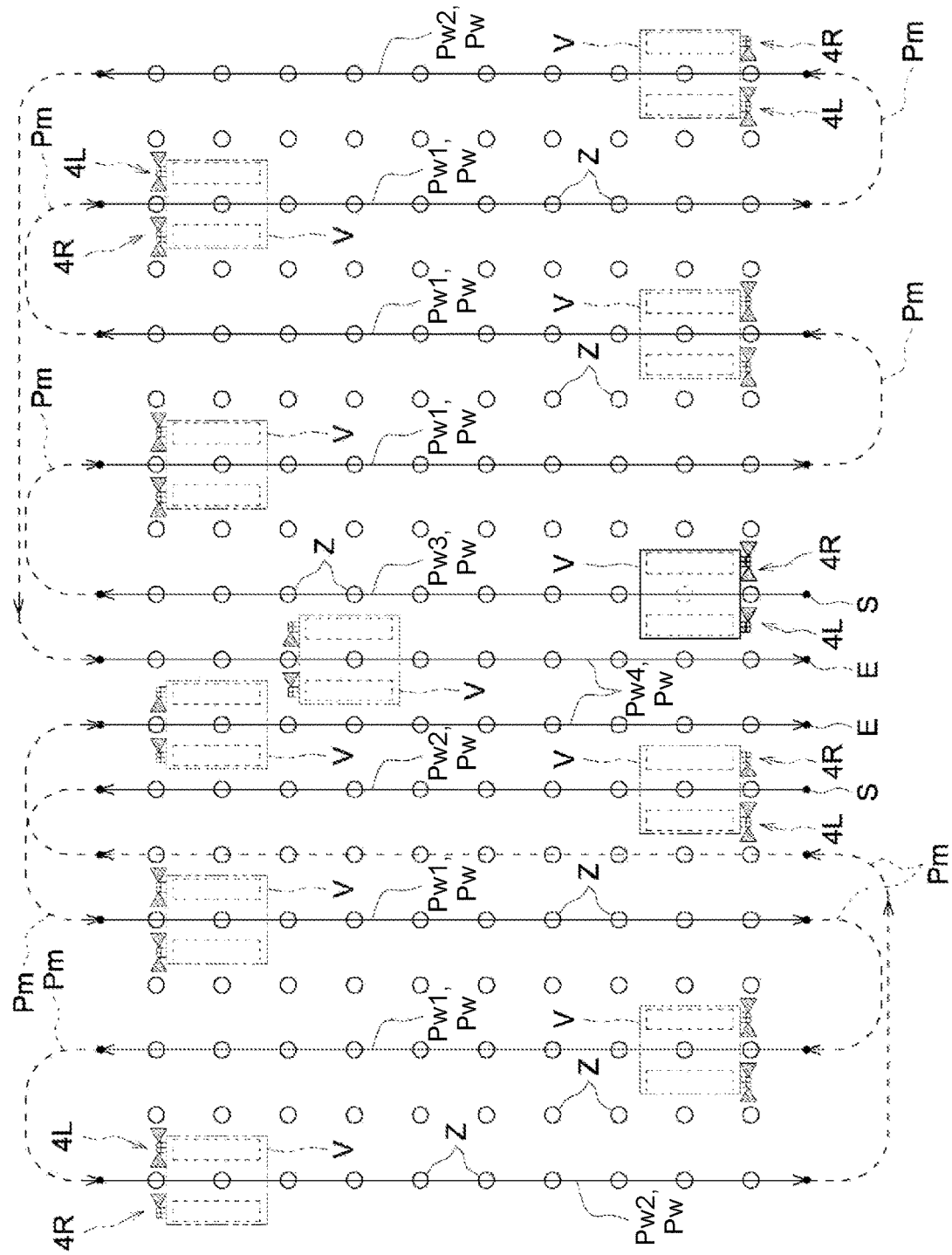
FIG. 31 is a plan view illustrating a target path for 18 rows which is generated by combining a target path for 8 rows and a target path for 10 rows.

Specifically, for example, as illustrated in FIG. 31, in a case where the number of fruit tree rows Zr in the orchard is 18, it is possible to generate the target path P for 18 rows by combining the target path P for right 8 rows (4n rows) and the target path P for left 10 rows (4n+2 rows). Further, in this case, by setting the path so that the end point position E of one target path P and the start point position S of the other target path P are located near each other, it is possible to shorten the moving distance of the work vehicle V between the target path P for right 8 rows and the target path P for 10 rows.

Note that, in the target path P for left 8 rows (4n rows) illustrated in FIG. 26 and the target path P for right 8 rows (4n rows) included in the target path P for 18 rows illustrated in FIG. 31, although the fruit tree row Zr (candidate line L5) that is not set as the work path (spraying path) Pw out of the fruit tree rows Zr adjacent to the spraying-start row is set as the move path Pm, the fruit tree row Zr (candidate line L5) that is set as the move path Pm can be changed to a fruit tree row Zr (candidate line L5) that is not the fruit tree row Zr (candidate line L5) at the outer end or the second fruit tree row Zr (candidate line L5) from the outer end.

Other Embodiments

Explanations will be given of other embodiments of the present invention. Note that the configuration of each of the other embodiments explained below can, not only be applied independently, but also be applied in combination with the configuration of another embodiment.

(1) For example, it is also possible that the work vehicle V is configured as an electric model which is equipped with left and right electric motors, instead of the engine 12 and the pair of HSTs 30, for independently driving the left and right crawlers 11.

(2) Regarding the work vehicle V, it is also possible that either one or both of the left and right crawlers 11 are connected to the vehicle body frame 10 so as to be capable of being raised and lowered via a raising/lowering drive unit.

(3) It is also possible that the work vehicle V is configured so that the left-right width of the vehicle body 1 can be changed together with the left-right distance between the left and right crawlers 11.

(4) The spraying patterns of the left and right liquid spray parts 4L and 4R are not limited to the spraying patterns exemplified in the above-described embodiment, and, for example, it is also possible to include the one-direction spraying pattern, in which one of the left and right liquid spray parts 4L and 4R sprays in only either one of the left and right directions and the other one of the left and right liquid spray parts 4L and 4R does not spray, etc.

(5) It is also possible that the target path generation part 3Bb performs only one of the above-described first pairing process and second pairing process.

ADDENDUM OF THE INVENTION

The first characteristic configuration of the present invention relates to an aspect that an automated driving system for spraying work includes a target path generation part that generates a target path for spraying work to be performed on spray target objects arranged in a plurality of rows, an automated driving control part that makes a work vehicle perform automated driving according to the target path, and a spray control part that switches spraying patterns of left and right liquid spray parts included in the work vehicle, wherein the left and right liquid spray parts are arranged in a state of being capable of spraying in a left-right direction and with an interval in the left-right direction so as to allow a spray target object to pass between the left and right liquid spray parts, the spraying patterns include a four-direction spraying pattern, in which each of the left and right liquid spray parts spray in both left and right directions, and a direction-limited spraying pattern, in which spraying directions of the left and right liquid spray parts are limited to three directions or less, and the target path generation part generates the target path with a path setting including a four-direction spraying path, in which the four-direction spraying pattern is set as the spraying pattern, and a direction-limited spraying path, in which the direction-limited spraying pattern is set as the spraying pattern.

According to the present configuration, in a case where the automated driving control part makes the work vehicle perform automated driving according to the four-direction spraying path, the spray control part switches the spraying patterns of the left and right liquid spray parts to the four-direction spraying pattern, and thus the left and right liquid spray parts spray a chemical, water, or the like on the spray target object located between them and the left and right spray target objects adjacent to this spray target object. Accordingly, if the target path generation part sets the four-direction spraying pattern as the spraying pattern for more spraying paths corresponding to the spray target rows in the middle side as an increase in the number of spray target rows in which spray target objects are linearly arranged, it is possible for the left and right liquid spray parts to spray a chemical or the like on every single spray target object included in the spray target rows in the middle while reducing the number of spraying paths relative to the number of spray target rows.

Further, in a case where the automated driving control part makes the work vehicle perform automated driving according to the direction-limited spraying path, the spray control part switches the spraying patterns of the left and right liquid spray parts to the direction-limited spraying pattern, and thus the left and right liquid spray parts spray a chemical, water, or the like only on spray target objects located in limited spraying directions among the spray target object located between them and the left and right spray target objects adjacent to this spray target object. Accordingly, as for the spraying paths where a spray target object does not exist in any of the four directions in which the left and right liquid spray parts can perform spraying or for the spraying paths where an already-sprayed spray target object exists, if the target path generation part sets a direction-limited spraying pattern according to the situation of each spraying path as the spraying pattern thereof, wasteful spraying or duplicated spraying of a chemical or the like with the left and right liquid spray parts can be avoided.

As a result, it is possible to provide an automated driving system for spraying work, which can enable spraying work on spray target objects, such as trees and crops that are arranged in multiple rows, to be performed properly and efficiently while automated driving of a work vehicle for which the driving distance is shortened.

The second characteristic configuration of the present invention relates to an aspect that the direction-limited spraying pattern includes a three-direction spraying pattern in which one of the left and right liquid spray parts sprays in both left and right directions and the other one of the left and right liquid spray parts sprays only in one of the left and right directions, and the target path generation part generates the target path with a path setting including a three-direction spraying path as the direction-limited spraying path, in which the three-direction spraying pattern is set as the direction-limited spraying pattern.

According to the present configuration, for example, it is possible to make the target path generation part generate the target path in which, out of multiple spray target rows, the spraying paths corresponding to the spray target rows in the middle side are four-direction spraying paths and the spraying paths corresponding to the spray target rows on the outer sides thereof are three-direction spraying paths. Further, by making the target path generation part generate such a target path, it is possible to spray a chemical or the like with the left and right liquid spray parts on every single spray target object included in each spray target row such that unnecessary spraying is suppressed while reducing the number of spraying paths relative to the number of spray target rows as much as possible.

The third characteristic configuration of the present invention relates to an aspect that the direction-limited spraying pattern includes a two-direction spraying pattern in which each of the left and right liquid spray parts sprays only in one of the left and right directions, and, in a case where the number of remainder rows when the number of rows of the spray target objects is divided by the maximum number of spraying directions of the left and right liquid spray parts is zero or two, the target path generation part generates the target path with a path setting including a two-direction spraying path as the direction-limited spraying path, in which the two-direction spraying pattern is set as the direction-limited spraying pattern.

According to the present configuration, since the maximum number of spraying directions of the left and right liquid spray parts is four directions, for example, in a case where the number of rows of spray target objects is 4n rows such as 8 rows or 4n+2 rows such as 10 rows, it is possible to make the target path generation part generate the target path in which, out of multiple spray target rows, the spraying paths corresponding to the spray target rows in the middle side are four-direction spraying paths and the spraying paths corresponding to the spray target rows on the outer sides are either one or both of the three-direction spraying paths and the two-direction spraying paths. Further, by making the target path generation part generate such a target path, it is possible to spray a chemical or the like with the left and right liquid spray parts on every single spray target object included in each spray target row such that unnecessary spraying is prevented while reducing the number of spraying paths relative to the number of spray target rows.

The fourth characteristic configuration of the present invention relates to an aspect that the target path generation part generates the target path, with a path setting according to which a second spray target row from an outer end is set as a spraying-start row in a case where the number of rows of the spray target objects is an even number, and with a path setting according to which a spray target row at an outer end is set as the spraying-start row in a case where the number of rows of the spray target objects is an odd number.

According to the present configuration, it is possible for the target path generation part to immediately determine a proper spraying-start row for performing the spraying work during automated driving of the work vehicle, based on the number of rows of spray target objects. Accordingly, it is possible to make the work vehicle quickly perform automated driving toward the spraying-start row and quickly start the spraying work during automated driving of the work vehicle. As a result, the spraying work during automated driving of the work vehicle can be performed efficiently.

The fifth characteristic configuration of the present invention relates to an aspect that the target path generation part specifies a first spray target object position which is at an outer end of each of the spray target rows in a first area, in which one end sides of the respective spray target rows are aligned, specifies a second spray target object position which is at an outer end of each of the spray target rows in a second area, in which the other end sides of the respective spray target rows are aligned, and specifies the second spray target object positions corresponding to the respective first spray target objects, in order to set a plurality of straight lines connecting the corresponding first spray target object positions and second spray target object positions as candidate lines of a spraying path.

According to the present configuration, since the target path generation part sets the straight lines connecting the first spray target object positions and second spray target object positions, which are at an outer end in each of the spray target rows, as the candidate lines of the spraying path, it is no longer necessary to specify the positions of all spray target objects in generation of the respective spraying paths. Accordingly, it is possible to easily generate a target path for spraying work, which is for performing the spraying work properly and efficiently during automated driving of the work vehicle.

The sixth characteristic configuration of the present invention relates to an aspect that, in a case where any one of the second spray target object positions corresponding to the first spray target object positions does not exist, the target path generation part sets a virtual second spray target object position corresponding to the first spray target object position, based on a row distance between the spray target objects in the second area, and sets a straight line connecting the corresponding first spray target object position and virtual second spray target object position as one of the candidate lines.

According to the present configuration, it is possible to properly set candidate lines of a spraying path without a need for specifying the respective second spray target object positions of the second area again. Accordingly, the generation of a target path for spraying work can be easily performed.

The invention claimed is:

1. An automated driving system for spraying work including a target path generation part that generates a target path for spraying work to be performed on spray target objects arranged in a plurality of rows, an automated driving control part that makes a work vehicle perform automated driving according to the target path, and a spray control part that switches spraying patterns of left and right liquid spray parts included in the work vehicle,
wherein the left and right liquid spray parts are arranged in a state of being capable of spraying in a left-right direction and with an interval in the left-right direction so as to allow a spray target object to pass between the left and right liquid spray parts,
the spraying patterns include a four-direction spraying pattern, in which each of the left and right liquid spray parts spray in both left and right directions, and a direction-limited spraying pattern, in which spraying directions of the left and right liquid spray parts are limited to three directions or less, and
the target path generation part generates the target path with a path setting including a four-direction spraying path, in which the four-direction spraying pattern is set as the spraying pattern, and a direction-limited spraying path, in which the direction-limited spraying pattern is set as the spraying pattern.

2. The automated driving system for spraying work according to claim 1,
wherein the direction-limited spraying pattern includes a three-direction spraying pattern in which one of the left and right liquid spray parts sprays in both left and right directions and the other one of the left and right liquid spray parts sprays only in one of the left and right directions, and
the target path generation part generates the target path with a path setting including a three-direction spraying path as the direction-limited spraying path, in which the three-direction spraying pattern is set as the direction-limited spraying pattern.

3. The automated driving system for spraying work according to claim 2,
wherein the direction-limited spraying pattern includes a two-direction spraying pattern in which each of the left and right liquid spray parts sprays only in one of the left and right directions, and, in a case where the number of remainder rows when the number of rows of the spray target objects is divided by the maximum number of spraying directions of the left and right liquid spray parts is zero or two, the target path generation part generates the target path with a path setting including a two-direction spraying path as the direction-limited spraying path, in which the two-direction spraying pattern is set as the direction-limited spraying pattern.

4. The automated driving system for spraying work according to claim 1,
wherein the target path generation part generates the target path, with a path setting according to which a second spray target row from an outer end is set as a spraying-start row in a case where the number of rows of the spray target objects is an even number, and with a path setting according to which a spray target row at the outer end is set as the spraying-start row in a case where the number of rows of the spray target objects is an odd number.

5. The automated driving system for spraying work according to claim 1,
wherein the target path generation part specifies a first spray target object position which is at an outer end of each of the spray target rows in a first area, in which one end sides of the respective spray target rows are aligned, specifies a second spray target object position which is at the outer end of each of the spray target rows in a second area, in which the other end sides of the respective spray target rows are aligned, and specifies the second spray target object positions corresponding to the respective first spray target object positions, in order to set a plurality of straight lines connecting the corresponding first spray target object positions and second spray target object positions as candidate lines of the work path.

6. The automated driving system for spraying work according to claim 5,
wherein, in a case where any one of the second spray target object positions corresponding to the first spray target object positions does not exist, the target path generation part sets a virtual second spray target object position corresponding to the first spray target object position, based on a row distance between the spray target objects in the second area, and sets a straight line connecting the corresponding first spray target object position and virtual second spray target object position as one of the candidate lines.

* * * * *